United States Patent
Vridhachalam et al.

(10) Patent No.: US 10,102,524 B2
(45) Date of Patent: Oct. 16, 2018

(54) ACCESS CONTROL AND MOBILE SECURITY APP

(71) Applicant: U.S. Bancorp, National Association, Minneapolis, MN (US)

(72) Inventors: Rajesh Vridhachalam, Millbrae, CA (US); Jason A. Witty, Naperville, IL (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 155 days.

(21) Appl. No.: 15/173,484

(22) Filed: Jun. 3, 2016

(65) Prior Publication Data

US 2017/0352028 A1  Dec. 7, 2017

(51) Int. Cl.
  G06Q 40/00    (2012.01)
  G06Q 20/38    (2012.01)
  H04L 29/06    (2006.01)
  G06F 21/40    (2013.01)
  G06Q 20/32    (2012.01)
  G06Q 20/10    (2012.01)

(52) U.S. Cl.
  CPC .......... *G06Q 20/382* (2013.01); *G06F 21/40* (2013.01); *G06Q 20/102* (2013.01); *G06Q 20/3223* (2013.01); *H04L 63/08* (2013.01); *H04L 63/10* (2013.01)

(58) Field of Classification Search
  CPC ............... G06Q 20/40; G06Q 20/3829; G06Q 20/4012; G06Q 20/32; G06Q 20/3226; G06Q 20/108; G06Q 20/322; G06Q 20/382; G06Q 20/3821
  See application file for complete search history.

(56) References Cited

U.S. PATENT DOCUMENTS 8,336,091 B2   12/2012  Wong
8,478,904 B2   7/2013   Jungck
(Continued)

FOREIGN PATENT DOCUMENTS

GB   2 496 354   5/2013

OTHER PUBLICATIONS

Diebold, Incorporated, "New Diebold Innovation Helps Consumers Secure Their Bank Cards and Accounts," Oct. 12, 2011. (1 page).

*Primary Examiner* — Kirsten S Apple
*Assistant Examiner* — Michael W Anderson
(74) *Attorney, Agent, or Firm* — Foley & Lardner LLP

(57) ABSTRACT

An illustrative apparatus includes a memory, a processor coupled to the memory, and a first set of instructions stored on the memory that can be executed by the processor. The processor is configured to determine authentication data, where the authentication data comprises an indication that a first functionality of a second set of instructions can be controlled and where the second set of instructions is separate from the first set of instructions. The processor is further configured to send to a user interface, an indication of the first functionality. The processor is further configured to receive, through the user interface, a request to control the first functionality of a second set of instructions that is separate from the first set of instructions. The processor is further configured to send an order to control the first functionality of the second set of instructions.

17 Claims, 17 Drawing Sheets

(56) References Cited

U.S. PATENT DOCUMENTS

| | | | |
|---|---|---|---|
| 8,483,663 B1* | 7/2013 | Jones | H04M 1/72577 |
| | | | 455/410 |
| 8,788,389 B1 | 7/2014 | Fernandes | |
| 2007/0143851 A1* | 6/2007 | Nicodemus | G06F 21/55 |
| | | | 726/25 |
| 2008/0162338 A1* | 7/2008 | Samuels | G06F 21/40 |
| | | | 705/38 |
| 2008/0249947 A1* | 10/2008 | Potter | G06F 21/31 |
| | | | 705/67 |
| 2010/0146263 A1* | 6/2010 | Das | G06Q 20/385 |
| | | | 713/155 |
| 2011/0202378 A1 | 8/2011 | Rabstejnek | |
| 2012/0124676 A1* | 5/2012 | Griffin | G06Q 20/12 |
| | | | 726/28 |
| 2012/0240203 A1* | 9/2012 | Kling | G06Q 20/425 |
| | | | 726/5 |
| 2013/0086639 A1 | 4/2013 | Sondhi et al. | |
| 2013/0097682 A1* | 4/2013 | Zeljkovic | H04L 9/3231 |
| | | | 726/7 |
| 2013/0117839 A1 | 5/2013 | White et al. | |
| 2013/0124855 A1 | 5/2013 | Varadarajan et al. | |
| 2013/0171594 A1 | 7/2013 | Gorman et al. | |
| 2013/0198821 A1 | 8/2013 | Hitchcock et al. | |
| 2014/0007222 A1 | 1/2014 | Qureshi et al. | |
| 2014/0058862 A1 | 2/2014 | Celkonas | |
| 2014/0157381 A1* | 6/2014 | Disraeli | G06F 21/31 |
| | | | 726/7 |
| 2015/0154597 A1* | 6/2015 | Bacastow | G06Q 20/4012 |
| | | | 705/72 |

\* cited by examiner

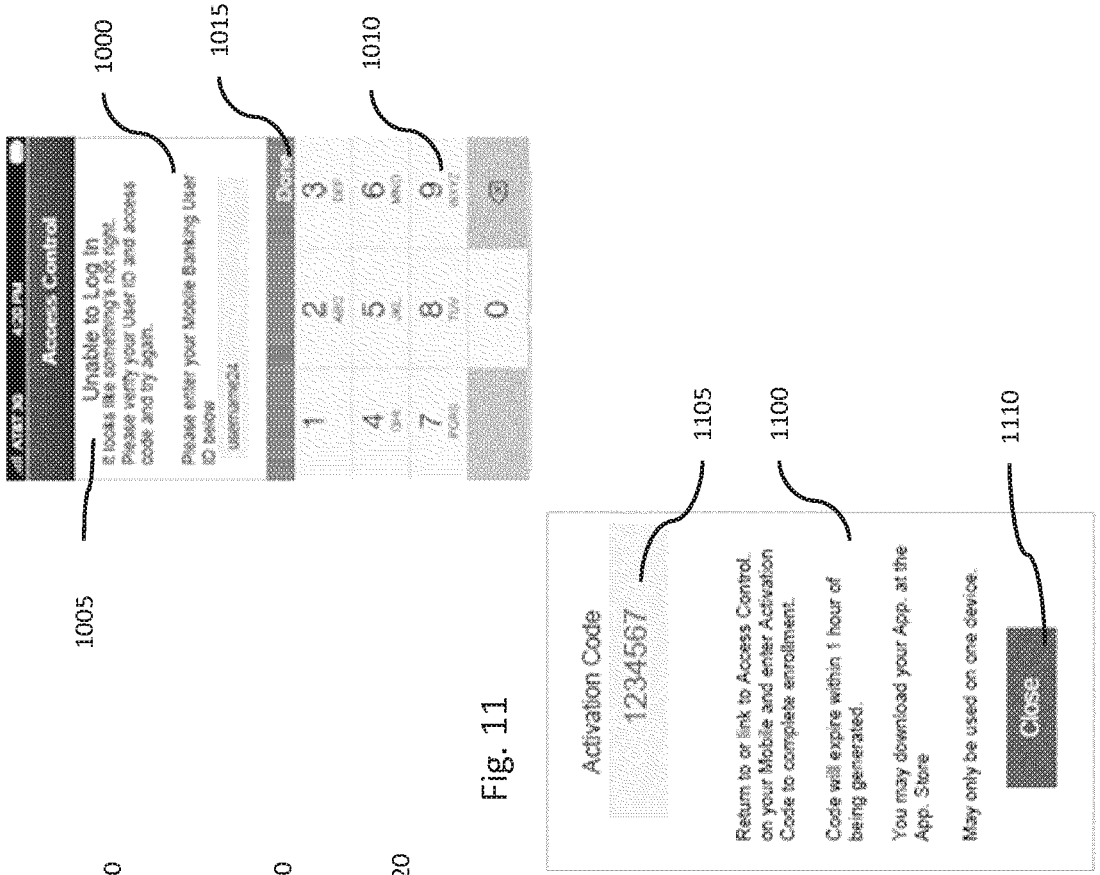
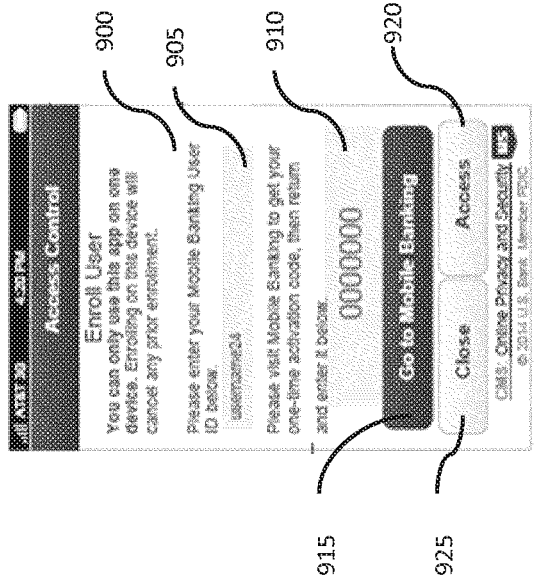
Fig. 9
Fig. 10
Fig. 11

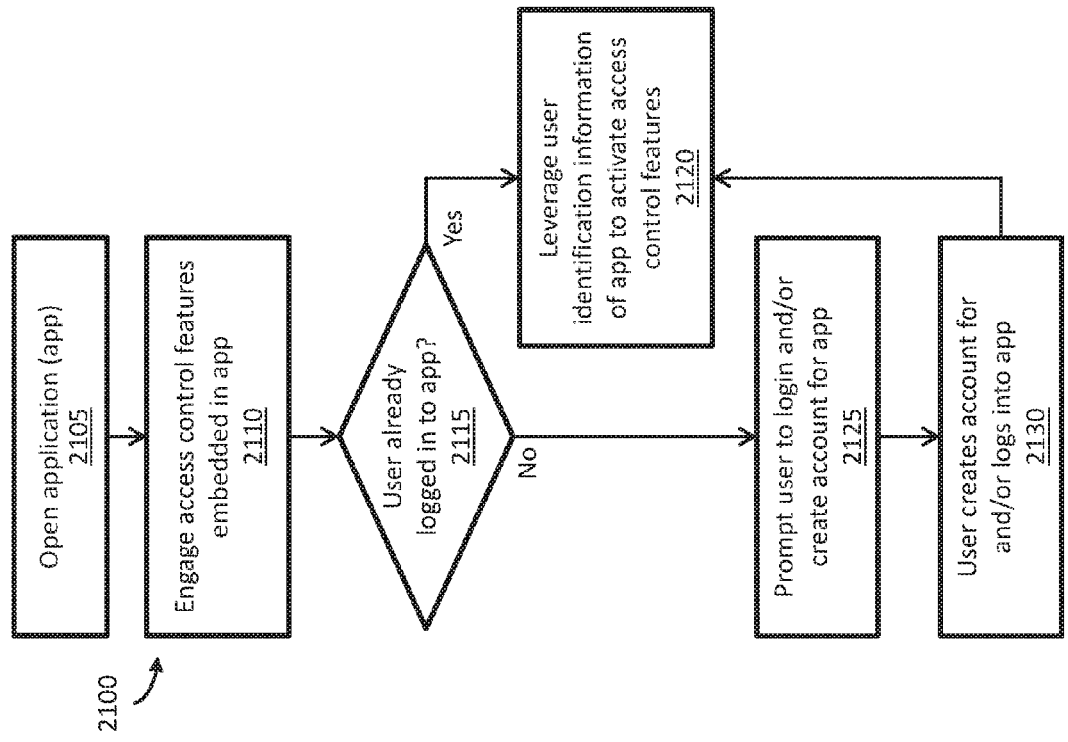
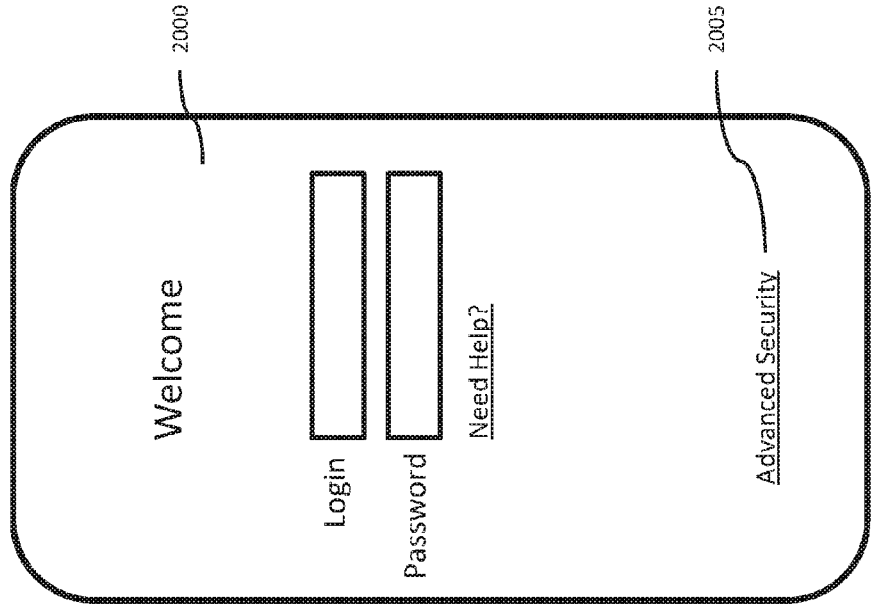

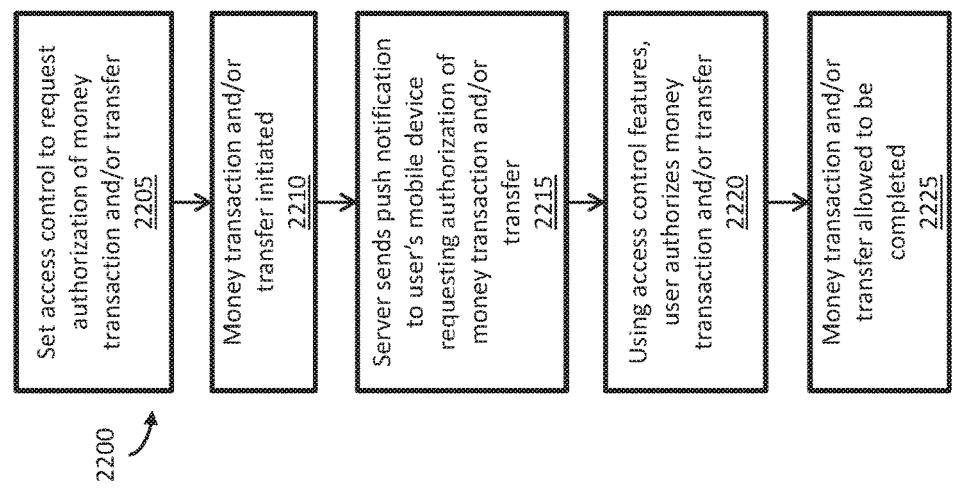

ACCESS CONTROL AND MOBILE SECURITY APP

BACKGROUND

Individuals use networks such as the Internet to conduct business, communicate with others, make purchases, perform online banking, pay bills, obtain information, advertise, distribute multi-media content, etc. However, as network usage increases, so does the risk of fraud and theft. Network users run the risk of being misrepresented, having their identities or credit card information stolen, having their accounts infiltrated, and/or having their personal information exposed. Criminals are often able to fraudulently obtain such information by using a man-in-the-middle process or other attack.

Such attacks may make personal information vulnerable to others. Furthermore, money stored in bank accounts may be accessed or stolen through online banking accounts. Other dangers can result if the user of a portable cell phone or smart phone loses their phone, as the phone may provide access to certain online banking accounts or functions. Some of these concerns can be addressed through security measures, such as logging into a mobile banking account utilizing a user identification (id) and a personal password.

SUMMARY

An illustrative apparatus includes a memory, a processor coupled to the memory, and a first set of instructions stored on the memory that can be executed by the processor. The processor is configured to determine authentication data, where the authentication data comprises an indication that a first functionality of a second set of instructions can be controlled and where the second set of instructions is separate from the first set of instructions. The processor is further configured to send, to a user interface, an indication of the first functionality. The processor is further configured to receive, through the user interface, a request to control the first functionality of a second set of instructions that is separate from the first set of instructions. The processor is further configured to send an order to control the first functionality of the second set of instructions.

An illustrative method according to a first set of instructions stored on the memory of a computing device, where the method includes determining, by a processor of the computing device, authentication data, where the authentication data includes an indication that a first functionality of a second set of instructions can be controlled and where the second set of instructions is separate from the first set of instructions. The method further includes sending, by the processor of the computing device, to a user interface, an indication of the first functionality. The method further includes receiving, at the processor of the computing device, through the user interface, a request to control the first functionality of a second set of instructions that is separate from the first set of instructions. The method further includes sending, by the processor of the computing device, an order to control the first functionality of the second set of instructions.

An illustrative system including a first memory, a first processor coupled to the first memory, a second memory, and a second processor coupled to the second memory, where a first set of instructions is stored on the first memory and runs on the first processor, a second set of instructions is stored on the second memory and runs on the second processor, and the second set of instructions is separate from the first set of instructions. The system further includes that the first processor execute the first set of instructions to determine authentication data, where the authentication data comprises an indication that a first functionality of the second set of instructions can be controlled. The first processor further executes the first set of instructions to send, to a user interface, an indication of the first functionality and receive, through the user interface, a request to control the first functionality of a second set of instructions that is separate from the first set of instructions. The first processor further executes the first set of instructions to send an order to control the first functionality of the second set of instructions. The second processor is configured to execute the second set of instructions to receive the order to control the first functionality of the second set of instructions.

BRIEF DESCRIPTION OF THE DRAWINGS

Illustrative embodiments will hereafter be described with reference to the accompanying drawings.

FIG. 9 is a figure representing a user interface that shows an access control application log in interface in accordance with an illustrative embodiment.

FIG. 10 is a figure representing a user interface that shows an access control application unable to log in interface in accordance with an illustrative embodiment.

FIG. 11 is a figure representing a user interface that shows an activation code generated interface in accordance with an illustrative embodiment.

FIG. 20 is a figure representing a user interface that shows access control functions embedded in an app in accordance with an illustrative embodiment.

FIG. 21 is a flow diagram illustrating a method for leveraging authentication information of a host app in accordance with an illustrative embodiment.

FIG. 22 is a flow diagram illustrating a method for authenticating a transaction in accordance with an illustrative embodiment.

DETAILED DESCRIPTION

Figure 1:
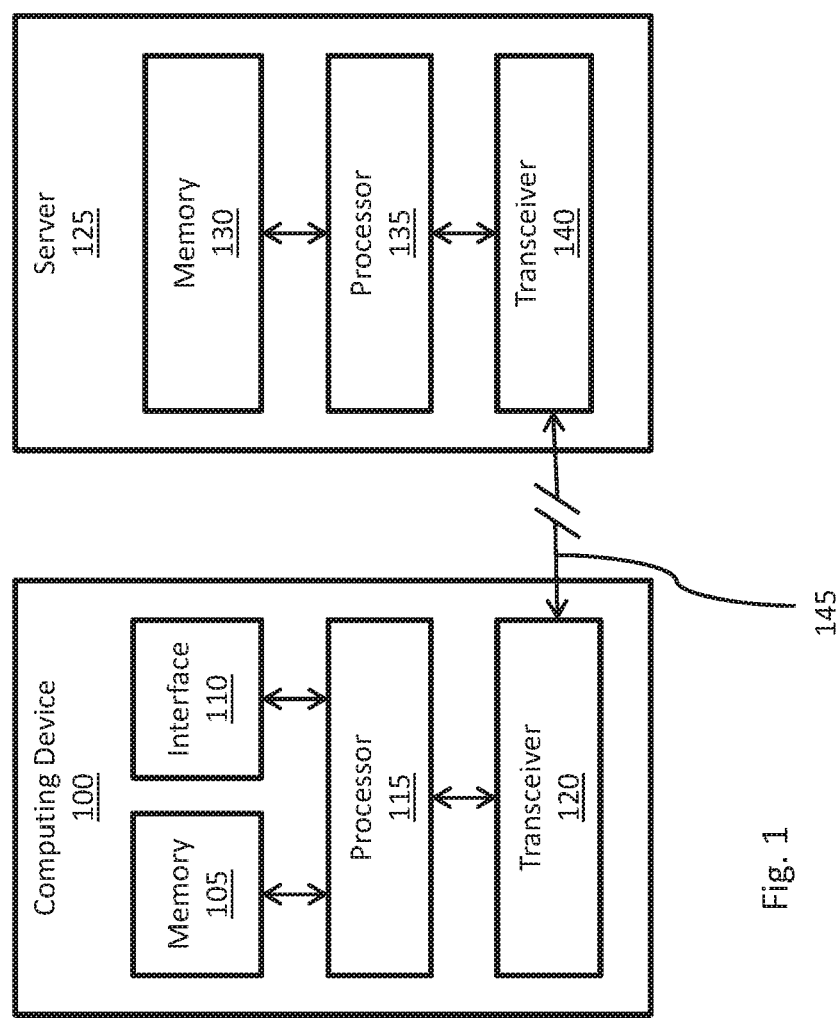
FIG. 1 is a block diagram illustrating a computing device and a server that may be used in accordance with an illustrative embodiment.

Described herein are illustrative embodiments for methods and systems that provide for an access control and mobile security application. A user of banking services may have or set up an accompanying mobile banking or online banking account. Both the mobile and online banking accounts may access information and services related to the user's actual bank account. The present disclosure is directed to a method, system, and computer-readable medium for a separate mobile application (or "app") may be provided to offer additional security and control of mobile and online banking accounts and functions.

In an illustrative embodiment, a user may download such an access control app or mobile security app to a smart phone. This access control app can be downloaded through standard app stores and may be downloaded separately from a mobile banking app. Once downloaded, a user may open the access control app, where they will be prompted to enroll the access control app for use. Enrolling the access control app may serve multiple purposes. First, enrolling the access control app ties the access control app to a specific banking account (or a specific number of bank accounts). Thus, when the access control app is used, it properly controls access and functionality to the appropriate accounts. Enrolling the access control app also adds additional security to the use of an access control app. Advantageously, this prevents accidental or wrongful controlling of a bank account via an access control app. Another advantage for enrolling an access control app ensures exclusive control of a bank account. In other words, an access control app may be configured such that, upon enrollment, any previously enrolled access control apps related to a particular bank account can no longer control any access or functionality of the particular bank account. Such a scenario may be beneficial if the owner of a smart phone who utilizes an enrolled access control app loses a smart phone or a smart phone is stolen. The user can then enroll the access control app on a new smart phone, resulting in the previous access control apps being unable to further control the bank account or the functionality of any mobile banking features.

In order to enroll the access control app, the user may be required to enter a user identification (id) and password relating to a previously established mobile and/or online banking account. A user id and password are a type of user defined authentication pattern. Other types of user authentication patterns that might be used include a personal identification number (PIN), fingerprint or other biometric, user selected recognizable photo and/or photo caption, and the like. Furthermore, the access control app may prompt the user to enter an activation code in order to enroll the access control app. In an illustrative embodiment, such an activation code may be randomly generated outside of the access control app. An activation code may be an alphanumeric sequence. Accordingly, the access control app may direct a user to an online banking website or a mobile banking app page to have a random activation code generated. Such a direction may be provided through a text instruction or a hyperlink causing such a website or app page to automatically open. Once at the online banking website or mobile banking app page, the user may be prompted to enter his or her user id and password relating to their mobile and/or online banking account. After the user has logged in with a user id and password, the user may be challenged with a step up or enhanced authentication, which is one way to verify the identity of the user and increase security. One example of an enhanced authentication challenge may be a challenge question. A challenge question may be a question selected by a user at the inception of the mobile and/or online banking account. In another embodiment, a challenge question may be different question not chosen by the user that asks them something to verify their identity. It may ask about personal information or information related to their account, such as an approximate amount of money in an account, approximate time or date of a recent transaction. At the inception of the account, the user may also specify custom answers for a challenge question, with the idea that only the individual that sets up the account will know the answer to such a challenge question. If a user successfully answers a challenge question, the enhanced authentication is satisfied, and the system may generate and display a randomly generated activation code that will be used to activate and enroll the access control app. An hyperlink may be provided to navigate the user back to the access control app.

Once back at the access control app, the user can enter the activation code generated at the online banking website or the mobile banking app. In an illustrative embodiment, if the activation code entered matches the one generated at the online banking website or the mobile banking app, the user receives a message from the app that the user has successfully enrolled the app and successfully authenticated it. In an illustrative embodiment, a user may only have a certain amount of time to enter the activation code after it has been issued. This may advantageously provide additional security, as it helps ensure that the person who logged in to the online or mobile banking website or app and was issued the activation code is actually the person utilizing the activation code to authorize and enroll the access control app.

In an illustrative embodiment, after authentication and enrollment, a digital certificate is created and issued for the mobile device that has installed the access control app. The digital certificate may allow the access control app to be used in the future without having to re-authenticate or enroll the access control app or the mobile device itself. The digital certificate itself may serve as a sort of enhanced authentication. In an illustrative embodiment, the digital certificate is stored on the mobile device. The terms digital certificate as used herein are not intended to limit security functions to a particular type, brand name, or feature of a security measure. Instead, digital certificate as used herein merely allows a devices to exchange information securely over the internet. For example, a digital certificate may use a public key infrastructure (PKI), and could in some embodiments be referred to as a public key certificate. In various embodiments, digital certificates may also be or include any of a smart credential, smart token, smart certificate, mobile device (such as iOS or Android) self-sign certificates, or any other type of similar secure communication implementation.

In an illustrative embodiment, the user can use an authenticated and enrolled access control app to control access to, or functionality of, mobile and online banking accounts. The access control app may display various online banking features, such as balance transfer, bill pay, change physical address associated with account, etc. A user may utilize the access control app to toggle off the ability to user particular online banking features and functionalities. A user may also use the access control app to block access to an online/mobile banking account altogether, preventing all functionality from being utilized. In an illustrative embodiment, preventing use of an online/mobile banking account altogether may involve preventing a user from logging in to the account. In another embodiment, preventing use of the account may allow a log in, but may not allow the functioning of any mobile online banking features, such as displaying a balance or recent transactions. In an illustrative embodiment, the online/mobile banking account may display a message indicating that access to an account or account functionality is disabled or limited by the access control app.

In an illustrative embodiment, each time a user logs in to or uses the access control app, the interface displayed by the app may indicate previous decisions by the user to limit or disable access to certain accounts or functionalities. One way this may be indicated is through a toggle switch. For example, a toggle switch for a funds transfer functionality may have a default position of on. Thus, the toggle button may be shown on the main menu of the access control app, and may be shown as on. When using the access control app, the user may toggle the toggle button to switch off the funds transfer functionality. Once the user confirms or saves the indication that the user wishes to disable the funds transfer functionality, no user or device can initiate a funds transfer on through the mobile banking or online banking platforms. In another embodiment, making such an indication in the access control app may also prevent funds transfers for the bank account itself, not just funds transfers executed through the mobile or online banking platforms. In further illustrative embodiments, the access control app may have higher level control that simply switching a functionality on and off. For example, a user may limit funds transfers to two hundred dollars or less as opposed to disabling funds transfers altogether.

One illustrative embodiment disclosed herein is a downloadable mobile access control app that confirms the identification of a user and allow the user to control access to their digital bank services (such as online and mobile banking). The access control app, in one embodiment, can only be used by a unique user on one unique device per account. In other words, a single bank account cannot be controlled by access control apps on multiple computing devices.

FIG. 1 is a block diagram illustrating a computing device and a server that may be used in accordance with an illustrative embodiment. In alternative embodiments, fewer, additional, and/or different components may be included in the system. In FIG. 1, there is a computing device 100 and a server 125. The computing device 100 includes a processor 115 that is coupled to a memory 105. The processor 115 can store and recall data and applications in the memory 105. The processor 115 can execute sets of instructions stored on the memory. In one example, a set of instructions may be a mobile application (app). The memory 105 may store more than one app (a first set of instructions and a separate set of instructions). Different and separate apps are apps that are not integrated into other applications or software programs. Separate apps often have different purposes and functionalities. Separate apps often are downloaded to a computing device separately. Throughout the application, if an app is referred to, it means a set of instructions stored on a memory that can be executed by a processor. Here, the processor 115 may also display objects, applications, data, etc. on an interface 110. The processor 115 is also coupled to a transceiver 120. With this configuration, the processor 115, and subsequently the computing device 100, can communicate with other devices, such as the server 125 through a connection 145.

The server 125 includes a processor 135 that is coupled to a memory 130. The processor 135 can store and recall data and applications in the memory 130. The processor 135 is also coupled to a transceiver 140. With this configuration, the processor 135, and subsequently the server 125, can communicate with other devices, such as the computing device 100 through the connection 145.

The devices shown in the illustrative embodiment may be utilized in various ways. For example, the connections 145 may be varied. The connection 145 may be a hard wired connection. A hard wired connection may involve connecting the devices through a USB (universal serial bus) port, serial port, parallel port, or other type of wired connection that can facilitate the transfer of data and information between a processor of a device and a second processor of a second device, such as between the computing device 100 and the server 125. In another embodiment, the connection 145 may be a dock where one device may plug into another device. While plugged into a dock, the client-device may also have its batteries charged or otherwise be serviced. In other embodiments, the connection 145 may be a wireless connection. Such a connection may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, the connection 145 may represent several different computing devices and network components that allow the various devices to communicate through the internet, either through a hardwired or wireless connection. The connection 145 may also be a combination of several modes of connection.

To operate different embodiments of the system or programs disclosed herein, the various devices may communicate in different ways. For example, the computing device 100 may download various software applications, such as an access control app, from the server 125 through the internet. Such software applications may allow the various devices in FIG. 1 to perform some or all of the processes and functions described herein. Additionally, the embodiments disclosed herein are not limited to being performed only on the disclosed devices in FIG. 1. It will be appreciated that many various combinations of computing devices may execute the methods and systems disclosed herein. Examples of such computing devices may include desktop computers, cloud servers, smart phones, personal computers, servers, laptop computers, tablets, blackberries, RFID enabled devices, or any combinations of such devices or similar devices.

In one embodiment, a download of a program to the computing device 100 involves the processor 115 receiving data through the transceiver 120 from the transceiver 140 of the server 125. The processor 115 may store the data (like the access control app) in the memory 105. The processor 115 can then execute the program at any time, including at a time specified by the user through the interface 110. In another embodiment, some aspects of a program or app may not be downloaded to the computing device 100. For example, the program or app may be an application that accesses additional data or resources located in the server 125. In another example, the program may be an internet-based application, where the program is executed by a web browser and stored almost exclusively in the server 125. In the latter example, only temporary files and/or a web browser may be used on the computing device 100 in order to execute a program, system, application, etc.

In yet another embodiment, once downloaded to the computing device 100, the program or app may operate in whole or in part without communication with the server 125. In this embodiment, the computing device 100 may access or communicate with the server 125 only when acquiring the program, system, application, etc. through the connection 145. In other embodiments, a constant or intermittent connection 145 may exist between the server 125 and the computing device 100. Where an intermittent connection exists, the computing device 100 may only need to communicate data to or receive data from the server 125 occasionally.

The configuration of the server 125 and the computer device 100 is merely one physical system on which the disclosed embodiments may be executed. Other configurations of the devices shown may exist to practice the disclosed embodiments. Further, configurations of additional or fewer devices than the ones shown in FIG. 1 may exist to practice the disclosed embodiments. Additionally, the devices shown in FIG. 1 may be combined to allow for fewer devices or separated where more than the two devices shown exist in a system.

In other embodiments, specialized hardware may exist on the devices shown in FIG. 1 that is specifically designed to perform or execute the various embodiments disclosed herein. For example, an RFID chip may be used to provide a certificate or enhanced authentication for security purposes.

Figure 2:
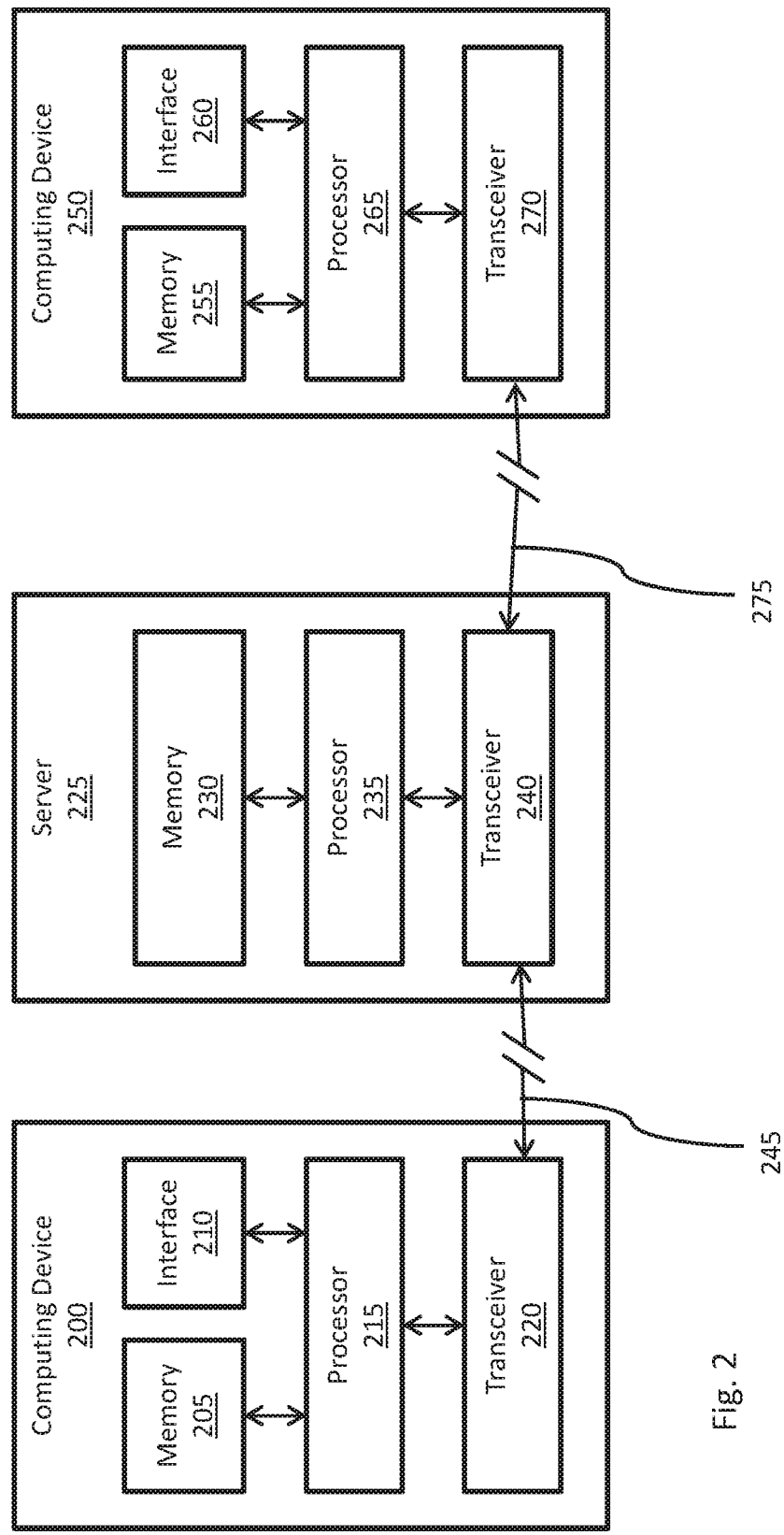
FIG. 2 is a block diagram illustrating computing devices and a server that may be used in accordance with an illustrative embodiment.

FIG. 2 is a block diagram illustrating computing devices and a server that may be used in accordance with an illustrative embodiment. In alternative embodiments, fewer, additional, and/or different components may be included in the system. In FIG. 2, there is a computing device 200, a server 225, and a computing device 250. The computing device 200 and the server 225 may be similar to the computing device 100 and server 125 as discussed above with respect to FIG. 1. Similarly, the computing device 200 and the server 225 may function similarly to the computing device 100 and server 125 as discussed above with respect to FIG. 1. Accordingly, the computing device 200 includes a processor 215 that is coupled to a memory 205. The processor 215 can store and recall data and applications in the memory 205. The processor 215 can execute sets of instructions stored on the memory. The processor 215 may also display objects, applications, data, etc. on an interface 210. The processor 215 is also coupled to a transceiver 220. The computing device 250 includes a processor 265 that is coupled to a memory 255. The processor 265 can store and recall data and applications in the memory 255. The processor 265 can execute sets of instructions stored on the memory. In one example, a set of instructions may be web browser that displays and/or executes a webpage. The processor 265 may also display objects, applications, data, etc. on an interface 260. The processor 265 is also coupled to a transceiver 270. With this configuration, the processor 265, and subsequently the computing device 250, can communicate with other devices, such as the server 225 through a connection 275. Connections 275 and 245 may function similarly to the connection 145 as mentioned above with respect to FIG. 1.

In just one illustrative embodiment, computing device 200 may be a smart phone, and the computing device 250 may be a desktop computer. In such an embodiment, the desktop computer may be used to log on to online banking and generate a code that is used to activate a mobile banking app on the computing device 200. The server 225 includes a processor 235 that is coupled to a memory 230. The processor 235 can store and recall data and applications in the memory 230. The processor 235 is also coupled to a transceiver 240. With this configuration, the processor 235, and subsequently the server 225, can communicate with other devices, such as the computing device 200 through the connection 245. The configuration of the computing device 200, the server 225, and the computing device 250 is merely one physical system on which the disclosed embodiments may be executed. Other configurations of the devices shown may exist to practice the disclosed embodiments. Further, configurations of additional or fewer devices than the ones shown in FIG. 2 may exist to practice the disclosed embodiments. Additionally, the devices shown in FIG. 2 may be combined to allow for fewer devices or separated where more than the two devices shown exist in a system.

Figure 15:
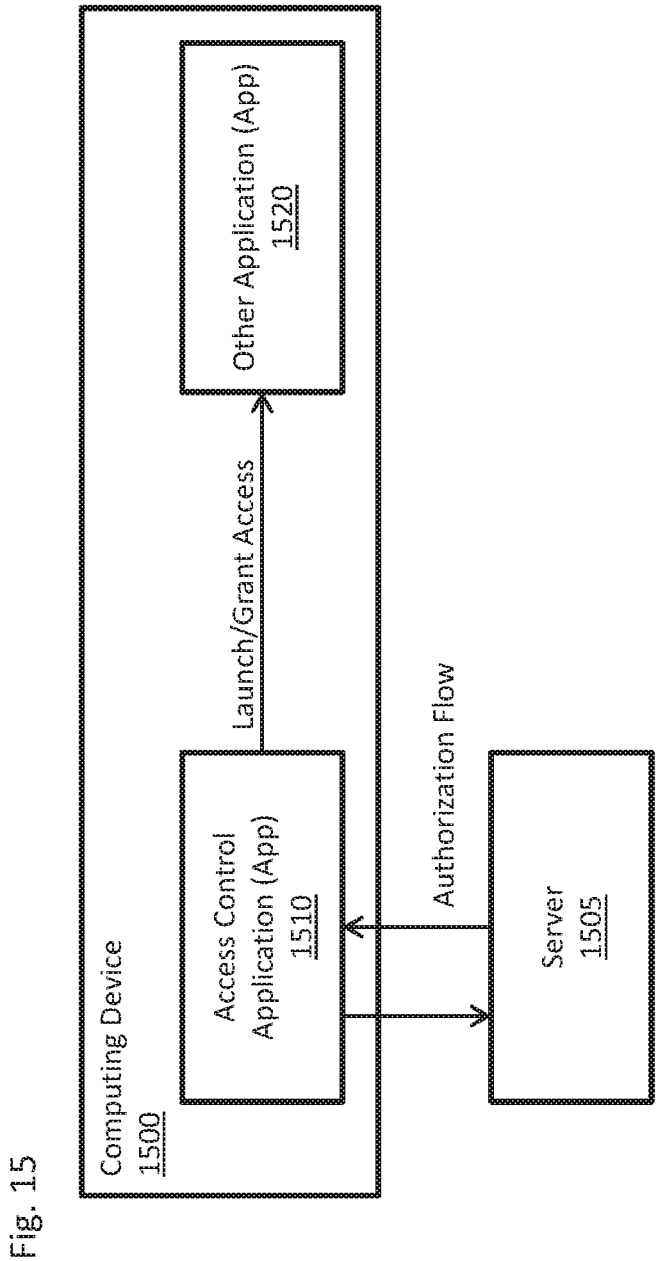
FIG. 15 is a block diagram illustrating communication between a server and a computing device in accordance with an illustrative embodiment.

FIG. 15 is a process flow diagram illustrating a process flow between a server and a computing device in accordance with an illustrative embodiment. In alternative embodiments, fewer, additional, and/or different operations may be performed. Also, the use of a flow diagram is not meant to be limiting with respect to the order of operations performed. One illustrative embodiment includes a computing device 1500 and a server 1505. The computing device may be the computing device 100 of FIG. 1, may be one of computing devices 200 and 250 of FIG. 2, or may encompass both computing devices 200 and 250 of FIG. 2 in one computing device 1500. The computing device 1500 has stored upon it an access control application (app) 1510 and another application (app) 1520. The access control app 1510 communicates with the server 1505 in an authorization flow. This authorization flow may include login procedures and other authorization methods, such as those described below with respect to FIGS. 3, 4, and 5. After the access control app 1510 has completed an authorization, it can launch and grant access to the other app 1520. In other words, the authorization flow completed in the access control app 1510 makes it so that accessing the other app 1520 happens automatically, either from an automatic opening of the other app 1520 after authorization or whenever a user subsequently opens the other app 1520. In this embodiment, the user is not required to complete a login or authorization when opening or using the other app 1520. In just one illustrative embodiment, the computing device 200 may be a smart phone that has both the access control app 1510 and the other app 1520 installed on it. The other app 1520 may also be an online banking app. In this embodiment, the other app 1520 may be in a logged in state (that is, the user can access the features of the app) based on the signals and communications (in FIG. 15 the launch/grant access signal) with the access control app 1510, which is on the same device (the computing device 1500) as the other app 1520.

Figure 3:
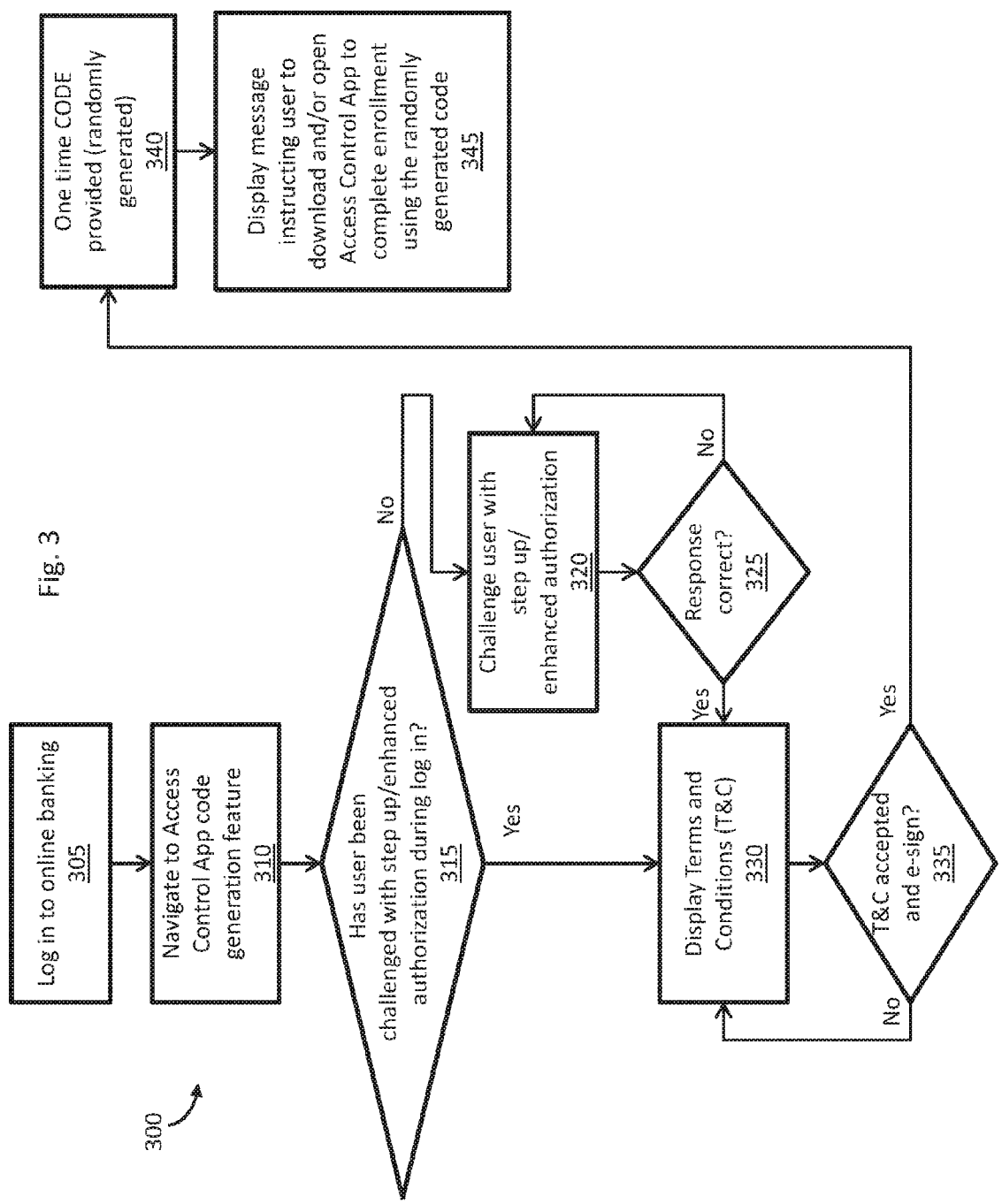
FIG. 3 is a flow diagram illustrating a method of generating an activation code for enrolling and authenticating an access control application in accordance with an illustrative embodiment.

FIG. 3 is a flow diagram illustrating a method 300 of generating an activation code for enrolling and authenticating an access control application in accordance with an illustrative embodiment. In alternative embodiments, fewer, additional, and/or different operations may be performed. Also, the use of a flow diagram is not meant to be limiting with respect to the order of operations performed. In an operation 305, a user logs in to online banking. Wherever online banking or mobile banking is referred to in this specification, it should be understood that online banking and mobile banking access the same information and generally capable of performing the same functions. That is, there is generally no separate mobile banking account and online banking account. A distinction between online banking and mobile banking may be that the actual interfaces of mobile banking and online banking may be differently configured. For example, a mobile banking interface or page may be designed for a mobile device such as a smart phone. A smart phone would have a smaller screen than a laptop or desktop computer, thus an online banking website may provide an interface better suited for the screens of the other computers. Nevertheless, for purposes of this application, it should be understood that any of the functions associated with mobile or online banking accounts referred to in this application can be performed in a mobile app, a mobile browser, a desktop or laptop browser, or other apps and browsers that run on other machines. In other words, where this specification refers to online banking, it should be understood to mean any platform, mobile or otherwise, that allows banking functions to be performed with a computing device. The operation 305 may be accomplished by a user going to a website for a bank and entering a user id and password. If the user id and password match information on file for an existing account with the bank, the user is logged in at operation 305. In other embodiments, additional information beyond a user id and password may be used to log in. For example, a challenge question may be used. In another embodiment, a server may check to see if the user has logged on from that particular device before.

In an operation 310, a user navigates to an access control app code generation feature. The user may navigate to the code generation feature by selecting an access control app code generation link from a menu of choices within the online banking interface. In another embodiment, the user may be automatically directed to an access control app code generation feature upon logging in to online banking. An automatic redirection may occur, for example, if the user had started out on a different webpage or in a different app, such as the access control app, and was directed to a hyperlink in order to log in to generate an access control app activation code.

In an operation 315, it is determined whether the user was challenged with a step up or enhanced authentication during log in. If the user was challenged with a step up or enhanced authentication during log in, the system will display terms and conditions of the access control app in an operation 330. If the user has not been challenged with a step up or enhanced authentication, the system challenges the user with a step up or enhanced authentication question in an operation 320. In an operation 325, it is determined whether a user's response to the step up or enhanced authentication question is correct. If a user does not enter the correct response in operation 325, they are prompted again with a challenge in operation 320. In some embodiments, access to an online banking account may be locked out or disabled if a user fails to get the correct response to a challenge in operation 320 after a certain number of tries. For example, a user may have to wait a certain amount of time before trying to log in again. In another embodiment, a user may have to have customer service reset the account over the phone. While talking to customer service, a user may be required to verify their identity in several ways (such as identifying the address, phone number, full name, approximate account balance, social security number, past addresses, etc.) in order to authorize the customer service representative to reset the account.

A step up or enhanced authentication, referred to throughout this specification, may be different in varying illustrative embodiments. One example of an enhanced authentication challenge may be a challenge question. This is an example of a knowledge based authentication. In other words, it requires that the user give an answer to a question only he or she knows the answer to, thereby verifying his or her identity. A challenge question may be a question selected by a user at the inception of the mobile and/or online banking account. At the inception of the account, the user may also specify custom answers for a challenge question, with the idea that only the individual that sets up the account will know the answer to such a challenge question. If a user can correctly, answer the question, the enhanced authentication is complete. Other examples of enhanced authentication or step up may include a personalized image and related text. A personalized image and related text may include text and/or images selected by the user upon creation of an online banking account. The personalized image and/or text may then appear each time a user is logging on. For example, a user may first enter their user id. If the user id is valid, the personalized image and/or text is then displayed that is associated with the user id. If the user recognizes the personalized image and/or text, the user can then proceed to enter their password and complete the log in. A personalized image and/or text may allow added security, in that a user can be more secure in knowing the website they are on is legitimate and not a fake or look-alike website trying to procure the user's user id an password. Other step up or enhanced authentications may involve biometrics, such as verifying a user's identity through a fingerprint scan or voice recognition. In another embodiment, the enhanced authentication may be in the form of a possession factor. A possession factor may authenticate identity through the use of a digital certificate stored on a computing device, or a digital certificate stored on some other medium, such as a USB drive. Other possession factor authentications could utilize a storage that holds a unique identifier or key. For example, possession of an RFID tag or USB drive with a unique identifier on it may be used to verify identity. Another example of a possession based enhanced authentication may the use of one-time passwords. Similar to the authentication code discussed in this specification, a one-time password is issued to a user whose identity may have already been separately verified. Since that user now has possession of the only working one-time password, it helps ensure that once the user logs in using the one-time password, that user is in fact the legitimate user of the account. After using the one-time password, the user may then be directed to change the password for the account, and the one-time password is no longer valid. Another example of a possession based step up or enhanced authentication may include recognizing a signature of a particular device. For example of a signature, an internet protocol (IP) number of a device may indicate identity of a particular user and serve as an enhanced authentication.

Returning to FIG. 3, in the operation 330, the terms and conditions for the access control app are displayed. If the terms and conditions are not accepted and e-signed in an operation 335, the terms and conditions are displayed again or are continued to be displayed in the operation 330. If the terms and conditions are accepted in the operation 335, then a one-time activation code is provided for the access control app in an operation 340. The user may be able to copy/paste the activation code into the access control app. In other embodiments, the user may not be able to copy/paste the activation code, and must either remember it or physically write it down. In another embodiment, the user may get an activation code on a desktop computer and enter the activation code into the access control app on a smart phone. In that case, the user would not need to remember or write down the code because they could enter it directly into the access control app while looking at the activation code on the desktop computer. In another embodiment, the user may exclusively be using a smart phone, and may be able to switch between the mobile banking app or browser and the access control app in order to avoid having to remember or write down the activation code. In another illustrative embodiment, the user may be able to copy the activation code from the browser and paste the activation code into the appropriate field in the access control app. In this way, the user does not have to remember the activation code at all, switch back and forth between the browser and the access control app, and can ensure that the activation code has been entered accurately. In some embodiments, this activation code is randomly generated. In other embodiments the activation codes are issued in a numerical order or are associated with some characteristic of the user, such as the user's birthday.

In an operation 345, a message is displayed indicating that the user may now use the activation code to complete enrollment for the access control app and actually authorize the access control app to control functionality or access of the mobile or online banking account. The message may also include instructions for using the activation code and authorizing or using the access control app. In addition, the displayed message may also include a hyperlink to the access control app. This hyperlink can allow the user to navigate directly to the access control app if the message is being displayed on a smart phone. The hyperlink may also take the user to the access control app page where the activation code should be entered. If the user has not yet downloaded the access control app, it can be downloaded as discussed below.

Figure 4:
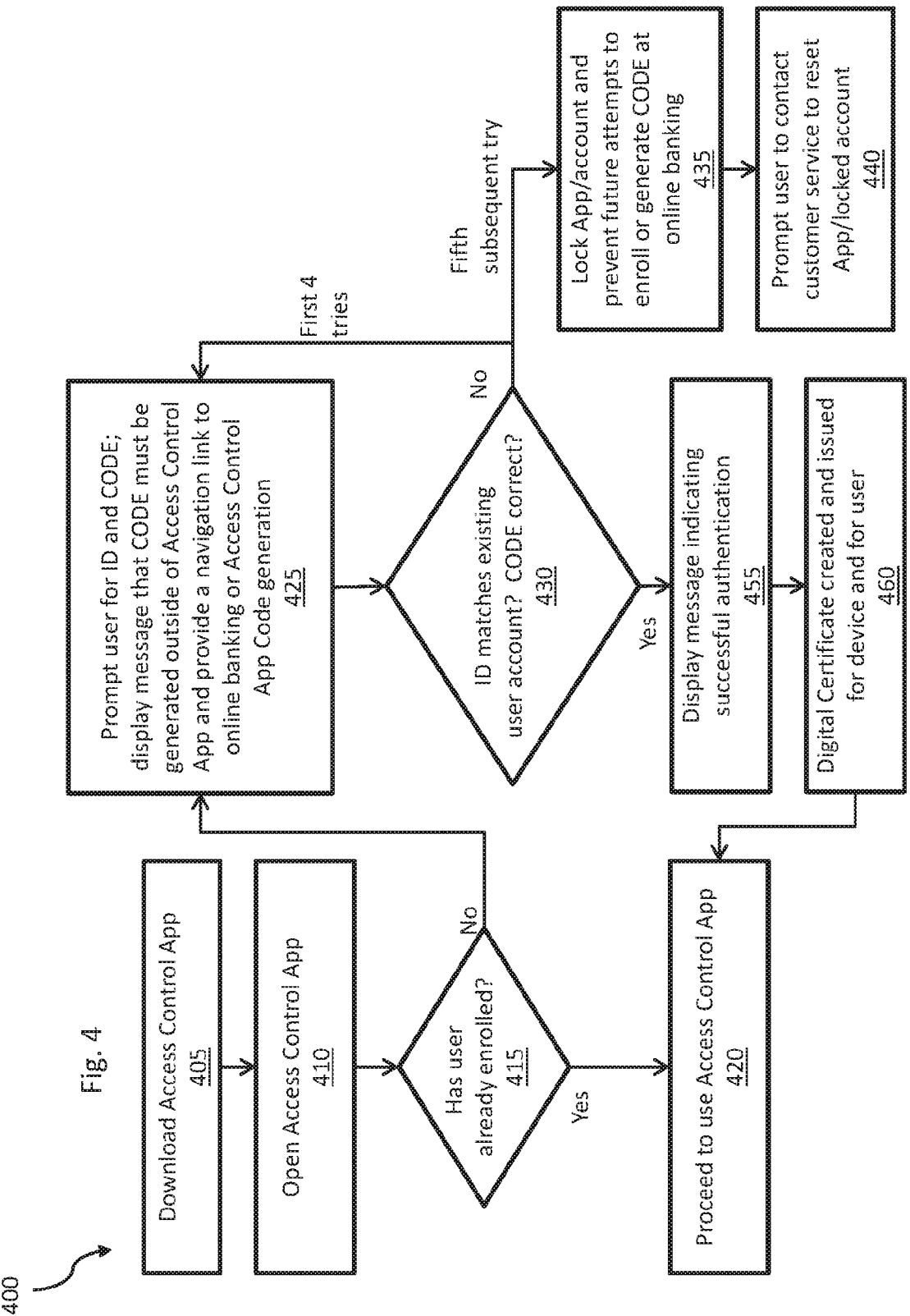
FIG. 4 is a flow diagram illustrating a method of enrolling and authenticating an access control application in accordance with an illustrative embodiment.

FIG. 4 is a flow diagram illustrating a method 400 of enrolling and authenticating an access control application in accordance with an illustrative embodiment. In alternative embodiments, fewer, additional, and/or different operations may be performed. Also, the use of a flow diagram is not meant to be limiting with respect to the order of operations performed. At an operation 405, a user downloads the access control app, if they have not done so already. In an embodiment where the user has already downloaded the app, such an operation is not necessary.

At an operation 410, a user opens the access control app. In an alternative embodiment, the access control app opens automatically after downloading. In another alternative embodiment, the access control app opens automatically when a user selects a hyperlink in another app, such as a web browser or a mobile banking app.

At an operation 415, the app automatically determines if the user has already enrolled and authorized the app for access control of mobile or online banking. Such a determination may determine whether certain authentication data is present. For example, the access control app may determine authentication data that the access control app authentication is tied to a particular mobile or online banking account. This may be accomplished by having a user log in with a user id and password when opening the access control app. In the alternative, a user who has previously authenticated and authorized the app may have the option to save one or both of the user id and password in the app, so that repetitive entering of the user id and/or password is not necessary each time the access control app is opened. Determining authentication data such as whether the user is enrolled and authorized to use the access control app may also utilize enhanced authentication, examples of which are discussed above. One example of an enhanced authentication may be a challenge question, which may also be used as authentication data. Another way the access control app may determine whether the app has been properly enrolled and authorized is by checking whether an activation code had been previously properly entered. In another embodiment, the app may determine whether a digital certificate exists that authenticates use of the access control app. In each possible embodiment disclosed herein for determining whether an access control app can be used (authentication data), the access control app may query a server, such as the servers shown in FIGS. 1 and 2, to verify the authentication, authorization, and/or enrollment for the access control app. For example, if a user id and password is entered, the user id and password may be sent to a server to check if they are valid and linked to a particular bank account. If so, the server may then send back information relating to the bank account, and authorizing control using the access control app. In another example of determining authentication data, if a digital certificate is used, the app may send a query to a server to verify the digital certificate, whether the certificate is stored on the server or the mobile device running the access control app.

In an alternative embodiment, an access control app may be able to control multiple mobile or online banking accounts. In such an embodiment, the access control app would need to enroll and authorize for each account.

If the user has already enrolled and is properly authorized to use the access control app as determined at the operation 415, then the user can proceed to use the access control app at an operation 420. One embodiment of using the access control app is described below with respect to FIG. 5.

If it is determined that the user has not already or properly enrolled the access control app at an operation 415, then a user is prompted to properly enroll and authenticate the access control app at an operation 425. In an illustrative embodiment the user is prompted at the operation 425 to provide a user id and the activation code generated in the mobile or online banking platform. Also at the operation 425, a message is displayed that an activation code must be generated through mobile or online banking and not in the access control app. In an alternative embodiment, the activation code may be generated and procured by the user over the phone with customer service, through paper mail, e-mail, or any other sufficient message delivery service. In another alternative embodiment, the activation code may be generated in the access control app itself.

At an operation 430, it is determined whether the user id and activation code entered match an existing user banking account and an activation code generated for that account. If the activation code and/or the user id are not a match, the user is prompted to reenter that information at the operation 425. In this embodiment, the user is given four opportunities to enter the correct user id and activation code. If the user does not do so within 4 tries, on the fifth try the control access app is locked and no further attempts at enrollment or activation are permitted at an operation 435. Additionally, five failed attempts also results in the user being unable to attempt to generate additional activation codes through an online or mobile banking account. In an alternative embodiment, five failed attempts may lock a user out of all online or mobile banking account functions. In alternative embodiments, any numbers may be used for determining when to lock out a user for failed attempts. For example, a user may be locked out after seven failed attempts instead of five. In another embodiment, failed attempts may never lead to a user being locked out. In another embodiment, the failed attempts may be related only to a user id. That is, if someone has forgotten their user id and tries 3 different user ids that all result in a failed log in, it will be considered for purposes of locking out a user that each user id has only had one failed log in, thus it may take an additional four failed log ins on any one of the previously tried user ids to lock out a customer. In this embodiment, a user would not be locked out for incorrectly entering an activation code, although the user may be prompted to generate another activation code in the mobile or online banking. In another embodiment, the access control app may only be able to lock out the user from attempting to enroll and authorize the access control app and not any other banking features, such as generating an activation code for an access control app. This may occur, for example, if the user tries to log in using one or more user ids that are not tied to a particular bank account. In this case, the user may not be able to be locked out of banking features or functions because the app cannot recognize that a particular user is attempting to log in because no valid user ids are being tried.

At an operation 440, the locked out user is prompted to contact customer service in order to reset the access control app and the locked user bank account. An embodiment of such a method is discussed below with respect to FIG. 8. In an alternative embodiment, a user may not call customer support, but instead only waits a predetermined amount of time before the access control app becomes active again. Similarly, a predetermined time might transpire before retrieving a new activation code through mobile or online banking account.

Back at the operation 430, if it is determined that the user has entered a valid user id and activation code, an operation 455 displays a message indicating that the access control app has been successfully authenticated. At an operation 460, a digital certificate is created and issued for device and for the user. If a user has previously enrolled to us an access control app, the user will be warned before proceeding that previous enrollments and certificates will be invalidated by the present enrollment. The digital certificate may be stored on the smart phone of the user, allowing the user to use the access control app in the future without having to repeat the authentication steps described above with respect to FIG. 4. After a digital certificate is created and issued at the operation 460, the user may proceed to use the access control app at the operation 420. One embodiment of using the access control app is described below with respect to FIG. 5.

Figure 5:
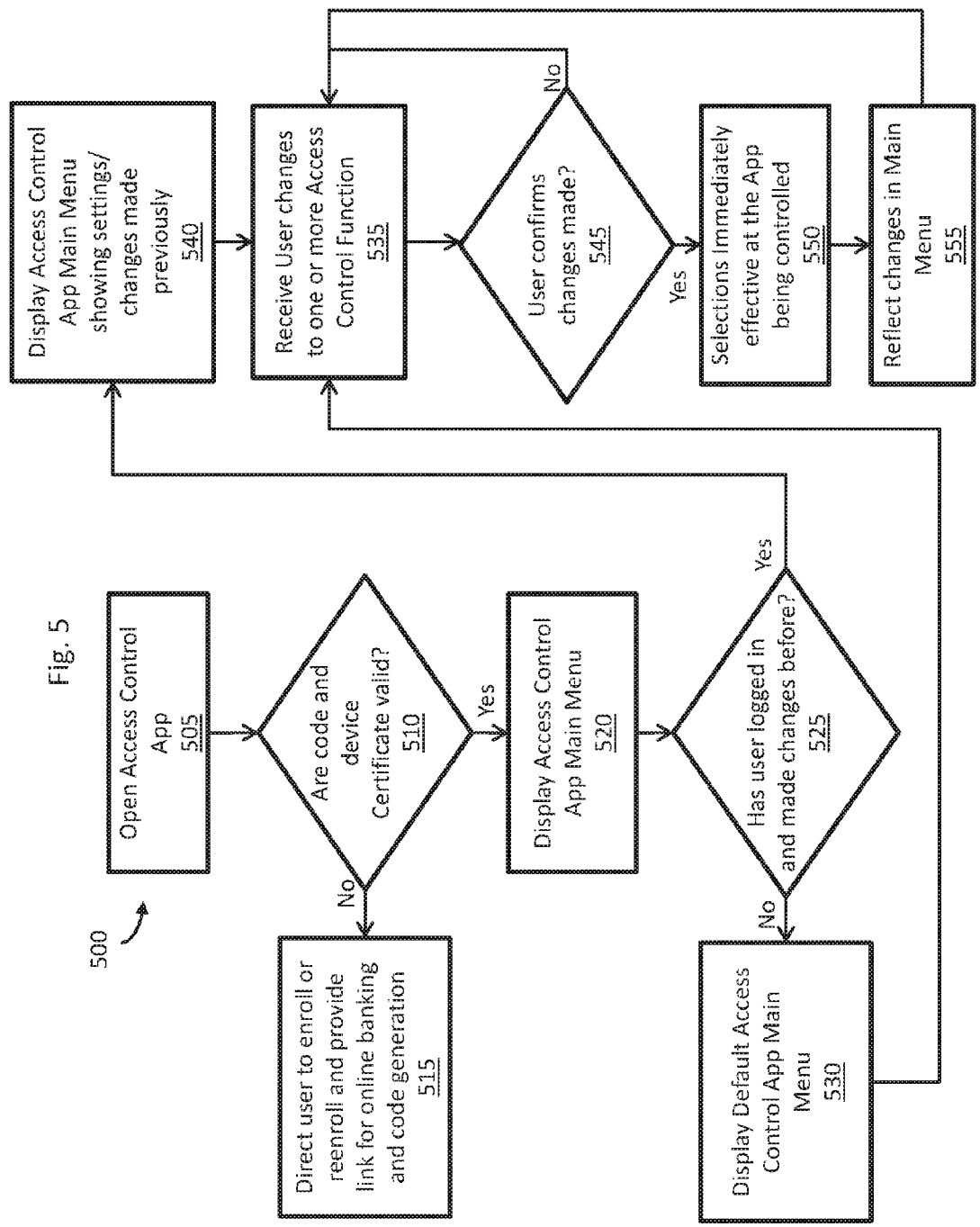
FIG. 5 is a flow diagram illustrating a method of using an access control application to control an access control function in accordance with an illustrative embodiment.

FIG. 5 is a flow diagram illustrating a method 500 of using an access control application to control an access control function in accordance with an illustrative embodiment. In alternative embodiments, fewer, additional, and/or different operations may be performed. Also, the use of a flow diagram is not meant to be limiting with respect to the order of operations performed. At an operation 505, a user opens the access control app. In an alternative embodiment, the user has already opened the app and has just completed the enrollment and authorization process, such as the one described above with respect to FIG. 4. In another embodiment, the access control app is opened or transitioned to automatically, through the use of a hyperlink in a web browser or another app, such as a mobile banking app.

At an operation 510, the access control app determines if the code and device certificate are valid. In other words, the app ensures that enrollment and authorization to use the app are correct and current. For example, if a user has installed and authorized an access control app on another device, the access control app on the present device will no longer be valid. If the code and/or certificate are not valid, the user is directed to enroll or reenroll, and a link to code generation at online banking is provided at an operation 515. If the code and device certificate are valid as determined at the operation 510, the access control app displays the access control app main menu at an operation 520.

In an illustrative embodiment, a user will not need to reenter any information (such as a user id, password, or activation code) to use the access control app. The user will be automatically logged in upon opening the access control app if the digital authentication certificate is present in the mobile device. In alternative embodiments, certain information may be reentered for the user to use the access control app. For example, any of a user id, password, activation code, challenge question, or biometric information may be used to allow a user to use the access control app.

At an operation 525, it is determined whether the user has logged in an made access control changes with the access control app before. If the user has not used and/or made changes before, the default access control app main menu is displayed at an operation 530. If the user has used and/or made changes in the access control app before, an access control app main menu is shown that reflects saved changes made previously with the access control app. In alternative embodiments, not all changes or features may be visible from the main menu. The main menu may have accessible sub-menus, or links that lead to other pages within the access control app. After either a default menu as in operation 530 or a main menu reflecting previously saved changes as in operation 540 is displayed, the access control app receives changes from a user to one or more access control features or functions. This could include disabling a mobile or online banking account altogether. Other functionalities that may be disabled may include any of withdrawing funds from a mobile banking account, transferring funds from the mobile banking account, paying a bill from the mobile banking account, logging into the mobile banking account, checking the mobile banking account balance, money movement accounts and functionality, wire transfers of money (transfers to external accounts), and changing contact information associated with the mobile banking account. In another embodiment, rather than just decided which functions to disable or not disable, the user may be able to affect and control thresholds related to certain functionalities of mobile and online banking. For example, a user may put a maximum cap per day or month for withdrawals or money transfers from an account. A user may further select which features to limit or disable based on an actual or perceived risk of fraud or cyber-attack. In another embodiment, a user may limit transactions or withdrawals from an account that has automatic bill payments set up for the account. In one embodiment, a default would be to automatically cancel automatic bill payments when the access control disables transactions or withdrawals. In another embodiment, a default setting would be to create an exception for automatic bill payments that were set up prior to the transactions and withdrawals being disabled. In another embodiment, the user can choose in access control app whether to let automatic bill payments persist.

In another alternative embodiment, a user may be able to leave a function active, but set a threshold for when the function may be disabled. For example, a debit card linked to a bank account may be permitted to make transactions and withdrawals up to $300 per day. However, if the transactions and withdrawals exceed the threshold $300 per day, the debit card may be locked or deactivated, as opposed to just limited to a certain transaction threshold.

In another alternative embodiment, multiple users may have access to the same account. In this case, an administrator user may have access to the access control app. In this scenario, the administrator, in addition to all the ways online banking may be controlled with an access control app described above, may be able to control the online banking on a per user basis. For example, an administrator may be able to determine that user A should only be allowed to check the balance of a particular account, while user B can check the balance, perform bill pay, and view a transaction record using the particular account.

At an operation 545, the user confirms and saves the changes made in the access control app. If the changes are not saved, the access control app continues to receive user changes to one or more access control functions as in operation 535. In an alternative embodiment, saving the changes made may not be a separate step, and may occur when the change is made, or when the access control app is closed.

If the changes are saved at the operation 545, the selections are immediately effective at the app being controlled at an operation 550. That is, once the changes are saved, the functionality adjusted or controlled in the access control app is now actually adjusted or controlled in the mobile or online banking account.

In an illustrative embodiment, a message may be sent to the user to notify the user that a change has been made in the access control app. Such a message may be sent to the user through a phone call, an automated phone call, a text message, an e-mail, a social network message or chat, a fax, paper mail, a push notification, etc. A customer may be notified of certain changes while not notified of others. For example, if the complete access to an account is disabled, this is important and impacts the user a great deal so the user may be notified. In another example, if a seldom used functionality of mobile banking is disabled, this may not affect the user much and a notification of the change may not be sent. In other embodiments, a user may be notified for all changes made in the access control app. Furthermore, in an illustrative embodiment, the content of such a notification should be sensitive in order to improve security for the account and the access control app. In other words, an e-mail to the user of an online or mobile banking account that an access to an account has been disabled need not include information like the account number, password, or a current balance of the account.

At an operation 555, the changes made and saved by the user are reflected in the main menu. In other words, if a toggle switch regarding ATM (automated teller machine) withdrawals is switched from "on" to "off," then after saving the changes the toggle switch now indicates the "off." In this embodiment, that toggle switch showing "off" would indicate that ATM transactions on the account are not currently authorized by the access control app for the applicable mobile or online banking account. After the changes made and saved by the user are indicated in the main menu, the main menu can receive user changes to one or more user access control functions as in the operation 535.

Figure 6:
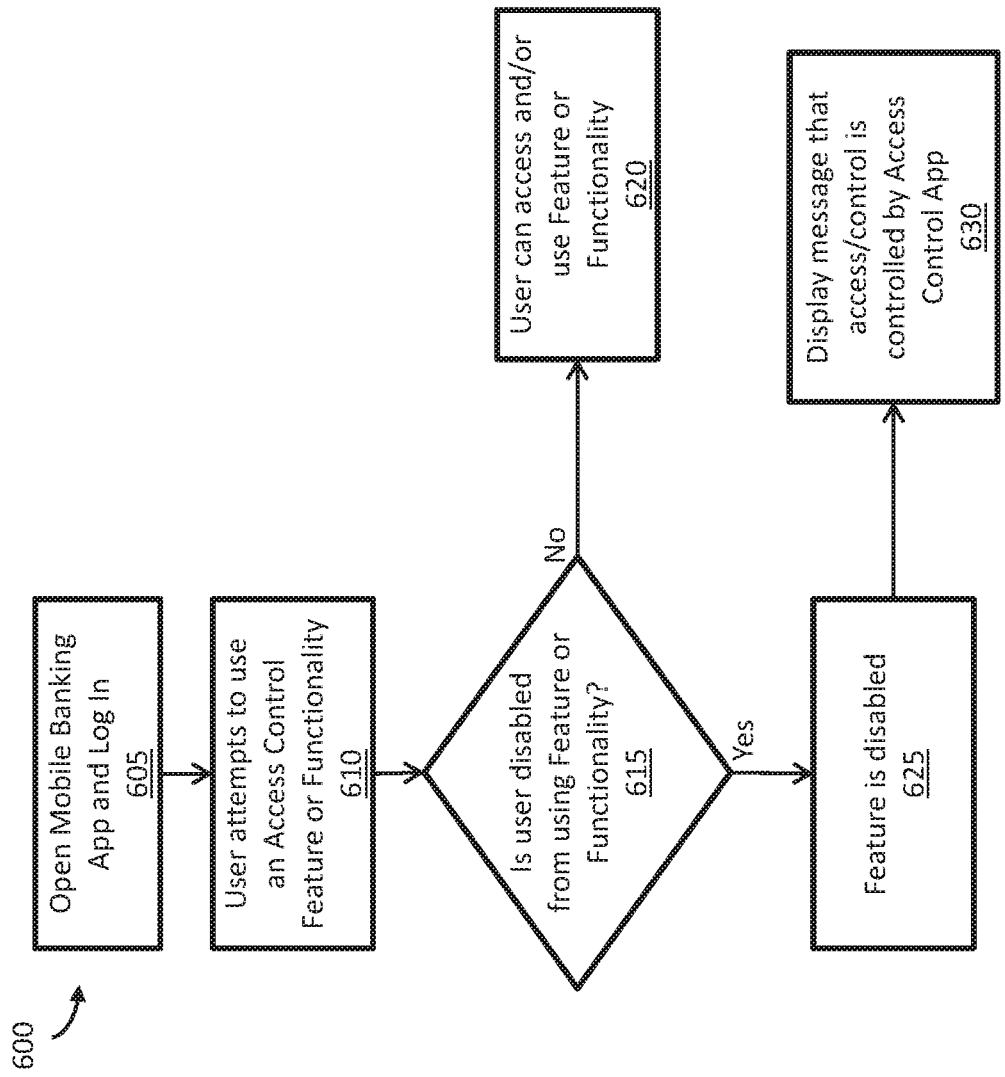
FIG. 6 is a flow diagram illustrating a method of using an online banking function that has been disabled using an access control application in accordance with an illustrative embodiment.

FIG. 6 is a flow diagram illustrating a method 600 of using an online banking function that has been disabled using an access control application in accordance with an illustrative embodiment. In alternative embodiments, fewer, additional, and/or different operations may be performed. Also, the use of a flow diagram is not meant to be limiting with respect to the order of operations performed. At an operation 605, a user opens a mobile banking app and logs in. Logging in to the mobile banking app may be performed by any of the authentication methods described herein. In this embodiment, a user logs in using a user id and password specific to the user's mobile banking account.

At an operation 610, the user attempts to use or access a functionality or feature of the mobile banking. For example, a user may attempt to check their account balance. In another example, a user may attempt to pay a bill or execute a funds transfer, either into or out of the account. At an operation 615, it is determined whether the user is disabled or limited from using the feature or functionality of the online banking.

At an operation 620, if the user is not limited or disabled from using the feature or functionality by the access control app, then the user can access and/or use the feature or functionality as normal. Using the examples from the preceding paragraph, in this case the user would be able to check their balance, pay a bill, or execute a funds transfer without any limit or restriction.

At an operation 625, the feature or function is disabled. In alternative embodiments, similar to examples previously discussed, a feature or function may merely be limited as opposed to disabled. However, in the embodiment shown in FIG. 6, the feature is disabled. Thus, using the examples from the preceding paragraphs, the user would not be able to check their balance, pay a bill, or execute any funds transfer using mobile banking.

At an operation 630, a message is displayed that indicates to the user that the function or feature they are attempting to access or use is being controlled or disabled by the access control app. In an alternative embodiment, the message may include a hyperlink that directs the user to the access control app, or to a website where the access control app can be downloaded. In another embodiment, the message might also display how the feature or function is limited or controlled. For example, if transfer funds feature is controlled so that funds can only be transferred into an account, the display message at the operation 630 may indicate that condition set by using the access control app. If a function or feature is completely disabled, the display message may indicate that the feature or function is completely disabled accordingly.

Figure 7:
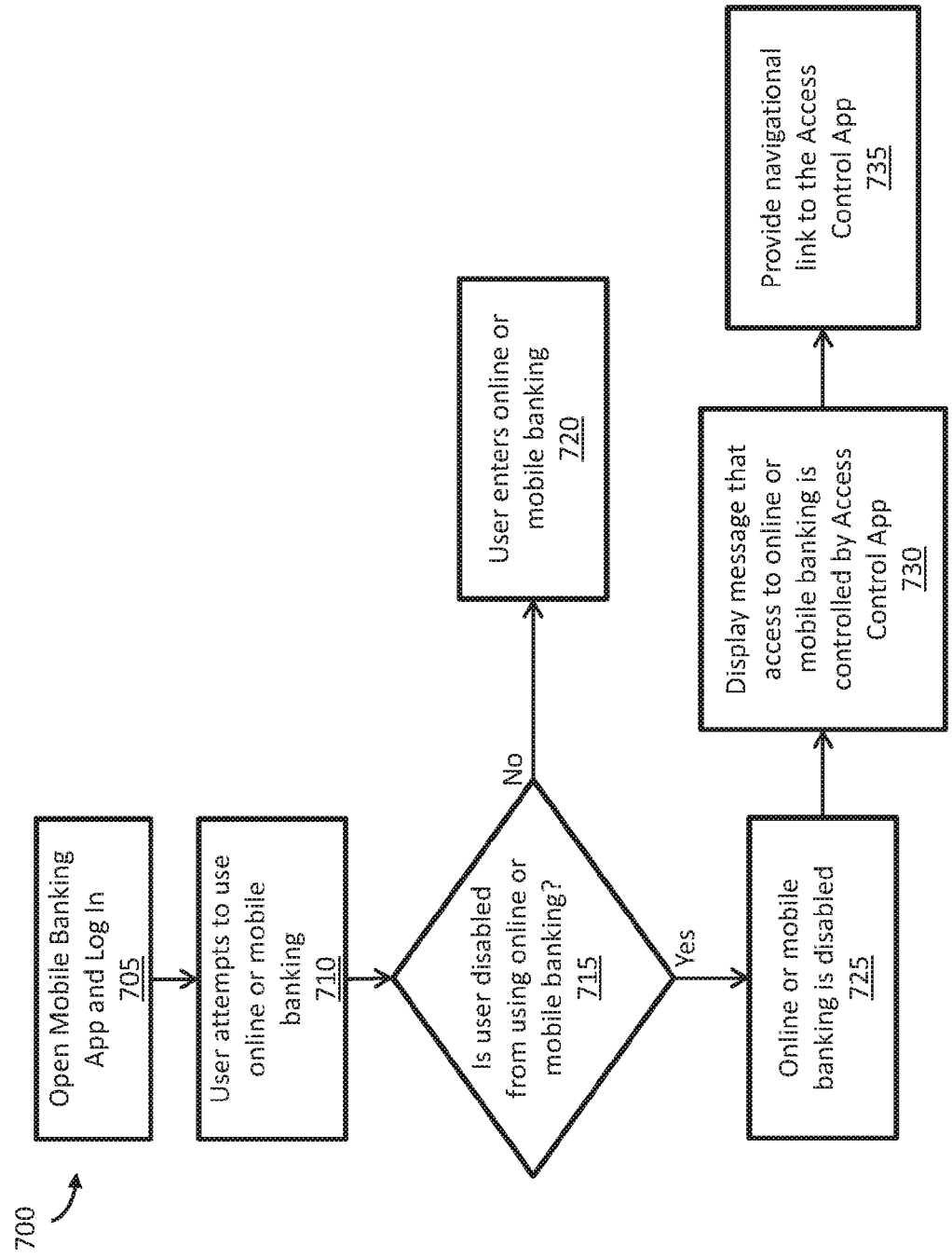
FIG. 7 is a flow diagram illustrating a method of using an access control application to disable online banking in accordance with an illustrative embodiment.

FIG. 7 is a flow diagram illustrating a method 700 of using an access control application to disable online banking in accordance with an illustrative embodiment. In alternative embodiments, fewer, additional, and/or different operations may be performed. Also, the use of a flow diagram is not meant to be limiting with respect to the order of operations performed. At an operation 705, a user opens a mobile banking app and logs in. Logging in to the mobile banking app may be performed by any of the authentication methods described herein. In this embodiment, a user logs in using a user id and password specific to the user's mobile banking account. In an alternative embodiment, if the access control app is set to prevent even a log in related to a particular bank account, the user will be prevented from logging in. Additionally, a message may be displayed indicating to the user why the log in is not successful: that is, that it is being prevented by the access control app. Such a message may also include a hyperlink to the access control app.

At an operation 710, the user attempts to use or access the online or mobile banking. For example, a user may attempt to select an account from a mobile banking main menu. At an operation 715, it is determined whether the mobile or online banking for that account is disabled.

At an operation 720, if the mobile or online banking account access is not disabled, then the user can access and/or use the features and/or functionalities of the mobile or online banking app. At an operation 725, the mobile or online banking account access is disabled. Thus, the user is not able to access the mobile or online banking account at all, including the various functions and features of the mobile or online banking account.

At an operation 730, a message is displayed that indicates to the user that the mobile or online banking account they are attempting to access is disabled by the access control app. In an operation 735, a hyperlink is provided that directs the user to the access control app, or to a website where the access control app can be downloaded.

Figure 8:
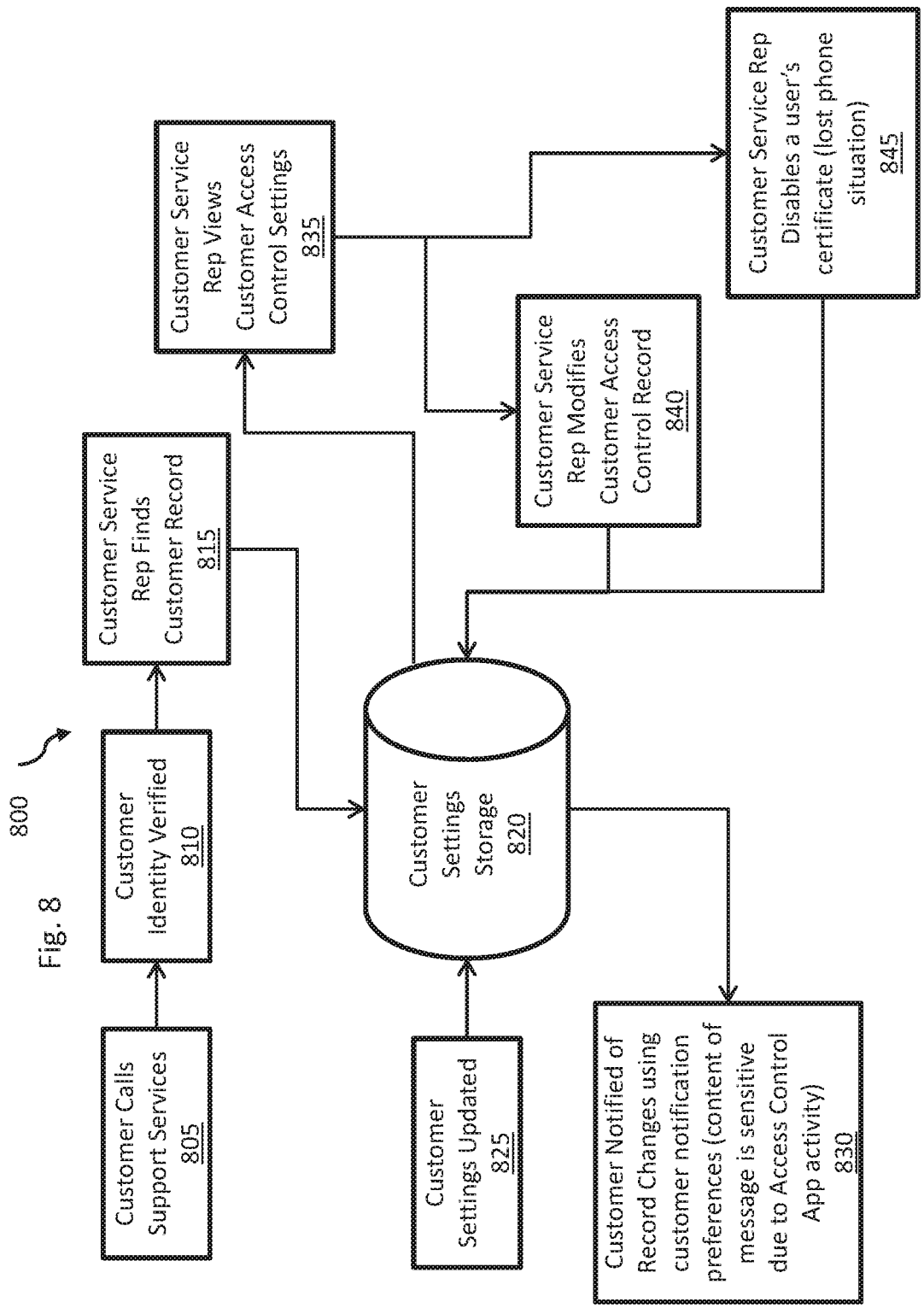
FIG. 8 is a process flow diagram illustrating a method utilizing customer assistance in relation to online banking and an access control app in accordance with an illustrative embodiment.

FIG. 8 is a process flow diagram illustrating a method 800 utilizing customer assistance in relation to online banking and an access control app in accordance with an illustrative embodiment. In alternative embodiments, fewer, additional, and/or different operations may be performed. Also, the use of a flow diagram is not meant to be limiting with respect to the order of operations performed. The method 800 in FIG. 8 shows what may happen if a customer calls support services for assistance relating to an access control app, including if mobile banking is disabled or if a user has locked themselves out of the access control app based on failed log in or authentication tries.

At an operation 805, a customer calls support services. In alternative embodiments, this "call" could occur through a conference call, video conference, online text chat, or through an in person encounter at a physical bank location. At an operation 810 a customer's identity is verified. A customer's identity may be verified in many ways, such as identifying the address, phone number, full name, approximate account balance, social security number, past addresses, etc. that are associated with the bank account.

At an operation 815, a customer service representative finds the customer record stored in the customer settings storage 820. It should be appreciated that the customer settings storage 820 could reside in part or in whole on any one of or any combination of the various memories shown in the embodiments depicted in FIGS. 1 and 2. At an operation 835, the customer service representative views the customer access control settings. Depending on why the customer called for help, the customer service representative can take different appropriate actions. For example, if a user had inaccurately entered an activation code and locked themselves out of the access control app (as discussed above with respect to FIG. 4), the customer service representative will modify the customer access control record at an operation 840. For example, the customer service representative may reset the account so that it returns to the state it was at (unlocked) before the user had several failures when attempting to log in. Additionally, the customer service representative may enable the account to receive another activation code for the access control app (this is in a case where only one activation code can be issued for an account without contacting customer service). In an alternate embodiment, the customer service representative will provide the customer with an unlocking code, which the customer must enter to unlock the access control app. Once the unlocking code is entered, the user can then proceed to using the access control app as they would have otherwise. In this embodiment, there may be a time limit between when a customer service representative issues an unlocking code and when the user must actually unlock the access control app with the code. The unlocking code in this embodiment is separate from an activation code. Whatever changes the customer service representative makes at the operation 840 are reflected in the customer settings storage 820. If a user is calling customer service representatives because he or she has lost or had his or her phone stolen, the customer service representative disables a user's digital certificate at an operation 845. This ensures that the digital certificate stored on a phone with an authorized and enrolled access control app is no longer valid. In other words, the access control app cannot be used on the stolen or lost phone any longer. Again, the customer service representative's action of disabling a user's digital certificate is reflected in the customer settings storage 820. In some embodiments, a customer service representative may perform both the actions at operation 840 and operation 845.

In an alternative embodiment, some or all of the functions of the customer service representative disclosed above could be performed by a user, or an account administrator designated by the user who does not work for the provider of the app. For example, if a child loses his or her phone, the child's parent may or may not have a separate banking account, but may be listed to have administrative rights for the child's account. Thus when the child loses the phone, a parent may be able to disable the digital certificate or modify an access control record so that a new activation code can be generated to enroll and authorize an access control app on a new phone.

In an operation 825, a customer updates the settings related to their account. This may impact the information a customer service representative uses in the operation 815 to verify the identity of a customer who calls for assistance. Accordingly, any changes to a customer setting are reflected in the customer settings storage 820.

In an operation 830, a customer is notified of record changes using customer notification preferences. A customer may be notified through a variety of mediums. For example, a customer may be notified of a change to their account settings through a phone call, an automated phone call, a text message, an e-mail, a social network message or chat, a fax, paper mail, a push notification, etc. A customer may be notified of certain changes while not notified of others. For example, if the password of an account is changed, this is important and impacts the security of the account so the user may be notified. In another example, if an accounts paper mail preferences are changed (i.e., that the user would rather receive e-mail statements rather than paper mail), this may not affect the security of the account and a notification of the change may not be sent. In other embodiments, a user may be notified for all changes to their customer settings. Furthermore, in the embodiment shown in FIG. 8, the content of a notification of a record change should be sensitive in order to improve security for the account and the access control app. In other words, an e-mail to the user of an online or mobile banking account that the account has been reset need not include the account number, password, or a new activation number for the account. Each of these items should either be known by the user or procured through the proper channels. For example, a new activation number may be acquired through the procedures discussed above with respect to FIG. 3.

Disclosed herein is also a user interface, which can be used with the disclosed systems and methods. The user interface can be part of the access control app and be used on a smart phone and allow a user to enroll in and authorize an access control app. Although FIGS. 9-13 show an access control app interface for a smart phone, other interfaces of the access control app are contemplated for such devices as a tablet device, laptop computer, desktop computer, blackberry, computing enabled televisions, PDA, set top box, gaming system, digital media players, computing enabled watches, computing hardware designed specifically to provide an interface for an access control app, etc. In the embodiments discussed below with respect to FIGS. 9-13, a smart phone may incorporate buttons and a touch screen. A smart phone may also incorporate digital buttons within the touchscreen. Through a combination of buttons and a touchscreen on a smart phone, a user may be able to interact with and make inputs to an app, specifically mobile banking and access control apps. Similarly, inputs may be made through other interfaces that are normally found as a part of or used with the other computing devices disclosed in this paragraph. Many embodiments for a user interface are contemplated, and FIGS. 9-13 merely show one illustrative embodiment.

FIG. 9 is a figure representing a user interface 900 that shows an access control application log in interface in accordance with an illustrative embodiment. The user interface 900 shows an initial screen of an access control app. On the initial screen instructions for use are included, as well as a user id entry field 905 and an activation code entry field 910. The initial screen also includes a button 915 for linking to a mobile banking app. If the button 915 is selected, the user is navigated to the mobile banking app in order to have an activation code issued, as discussed below with respect to FIG. 11. The initial screen also includes a close button 925 and an access button 920. In this embodiment, activation of the close button 925 would close the access control app. Activation of the access button 920 indicates that the user id and the activation code have been entered in the user id entry field 905 and the activation code entry field 910. If the user id and activation code are not correct, the access control app will navigate to an unable to log in interface that is discussed below with respect to FIG. 10. If the user id and activation code are correct, the access control app will navigate to a main menu control panel interface, discussed below with respect to FIG. 12.

FIG. 10 is a figure representing a user interface 1000 that shows an access control application unable to log in interface in accordance with an illustrative embodiment. The user interface 1000 shows an unable to log in message 1005, indicating that something was not right with the user id or activation code. The user is prompted by the unable to log in message 1005 to try entering the user id an activation code again. In other embodiments, the unable to log in message 1005 may include other information, particularly if the number of log in attempts has been exceeded. For example, if the number of log in attempts has been exceeded, the unable to log in message 1005 may inform the user that no more log in attempts are allowed at this time and that the user must contact customer service to have the access control app reset. The unable to log in message in this embodiment may also include instructions and or contact information on how to reach customer service. The user interface 1000 also shows an input number set 1010, which may be used by the user to input the activation code. Additionally, a done button 1015 is shown which can assist the user in removing the input number set 1010 from view so that the entire user interface 1000 can be viewed.

FIG. 11 is a figure representing a user interface 1100 that shows an activation code generated interface in accordance with an illustrative embodiment. In this embodiment, user interface 1100 shows a screen that would exist in the mobile banking app. The user interface 1100 shows a generated activation code 1105 a close button 1110. Activating the close button 1110 closes the app. In alternative embodiments, activating the close button 1110 may return the user to a previous or home mobile banking interface or return the user to an interface in the access control app. The user interface 1100 also shows instructions for the user. In this embodiment, the instructions indicate that the user must use the activation code 1105 in the access control app, and must do so within one hour. The instructions further indicate that the access control app can be downloaded from an app store and that an activation code may only be used on one computing device.

Figure 12:
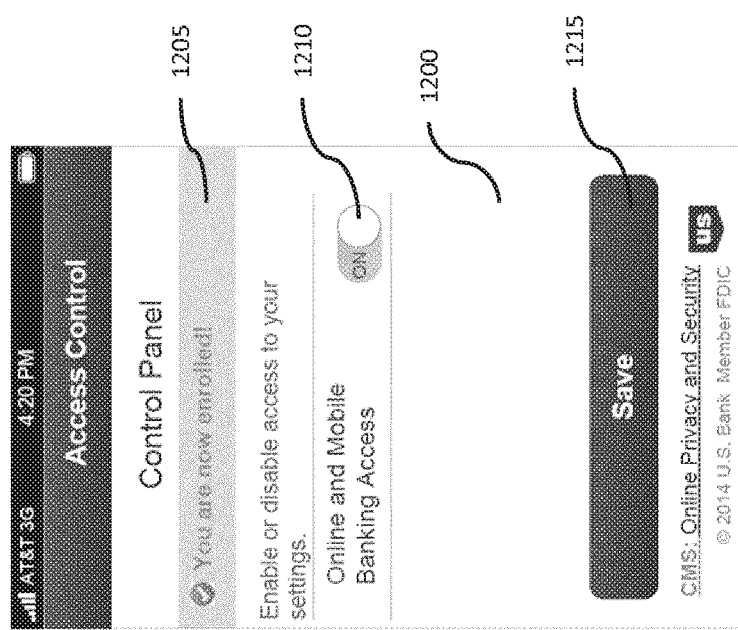
FIG. 12 is a figure representing a user interface that shows an access control application main menu interface in accordance with an illustrative embodiment.

FIG. 12 is a figure representing a user interface 1200 that shows an access control application main menu interface in accordance with an illustrative embodiment. If the user successfully enters a user id and an activation code in an interface like the one discussed with respect to FIG. 9, the user is navigated to the user interface 1200. The user interface 1200 includes a success message 1205, indicating that enrollment for the access control app was successful. The user interface 1200 also includes an access functionality toggle 1210 and a save button 1215. In this embodiment, the user may only toggle off and on access to online and mobile banking access. The access functionality toggle indicates to the user the current state of the access control. In the embodiment shown in FIG. 12, online and mobile banking access is "on," indicating that a user can access online and mobile banking. If a user interacts with the access functionality toggle 1210, the toggle will switch to an "off" position. Once the user interacts with the save button 1215, any changes made to the access functionality toggle 1210 will be saved and executed. Upon interacting with the save button 1215, the access control app will navigate to a confirmation interface like the one discussed with respect to FIG. 13. In alternative embodiments, more than one access functionality toggle can be shown for a variety functionalities and access parameters. Additionally, some functionalities that may be controlled in other embodiments may not be worthwhile to be displayed with a toggle button. For example, if a user wishes to control a number of transactions that can be performed in a week, the user interface may allow further interactions with transactions to allow a user to customize their desires for that particular functionality. This may utilize another interface within the access control app, or may be accomplished on an interface similar to the one shown in FIG. 12. Additionally, an alternative embodiment may show a functionality status other than an access functionality toggle 1210. For example, with the previous situation where a user wishes to limit a number of transactions per week, the interface may, instead of a toggle button, show what the current limit is for number of transactions per week.

Figure 13:
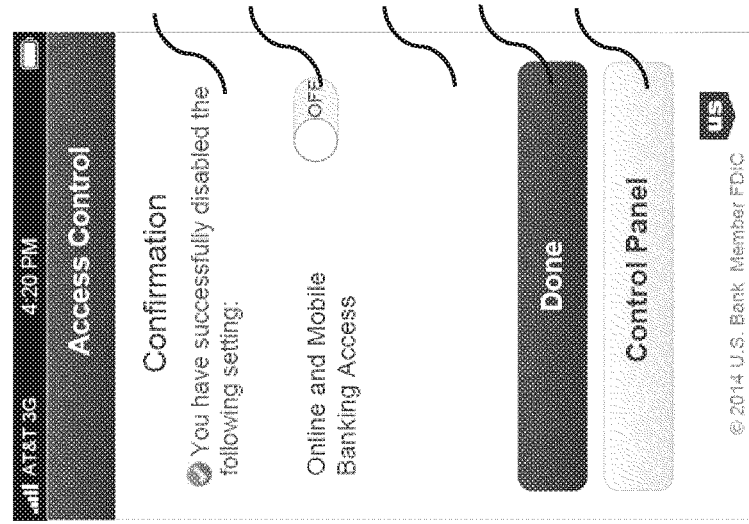
FIG. 13 is a figure representing a user interface that shows an access control application confirmation of changes interface in accordance with an illustrative embodiment.

FIG. 13 is a figure representing a user interface 1300 that shows an access control application confirmation of changes interface in accordance with an illustrative embodiment. The user interface 1300 includes a confirmation message 1305, an access functionality indicator 1310, a done button 1315, and a control panel button 1320. The confirmation message 1305 indicates to the user that an access control functionality change has been successfully saved and implemented. The access functionality indicator 1310 indicates to the user the specific access function that has been changed, and indicates that change. In this case, the access functionality indicator 1310 looks like the access functionality toggle 1210 from FIG. 12, so that a user can easily see the change that has been effected. If the user activates the done button 1315, the access control app will close. If the user activates the control panel button 1320, the access control app will navigate back to an interface similar to the one discussed above with respect to FIG. 12.

Figure 14:
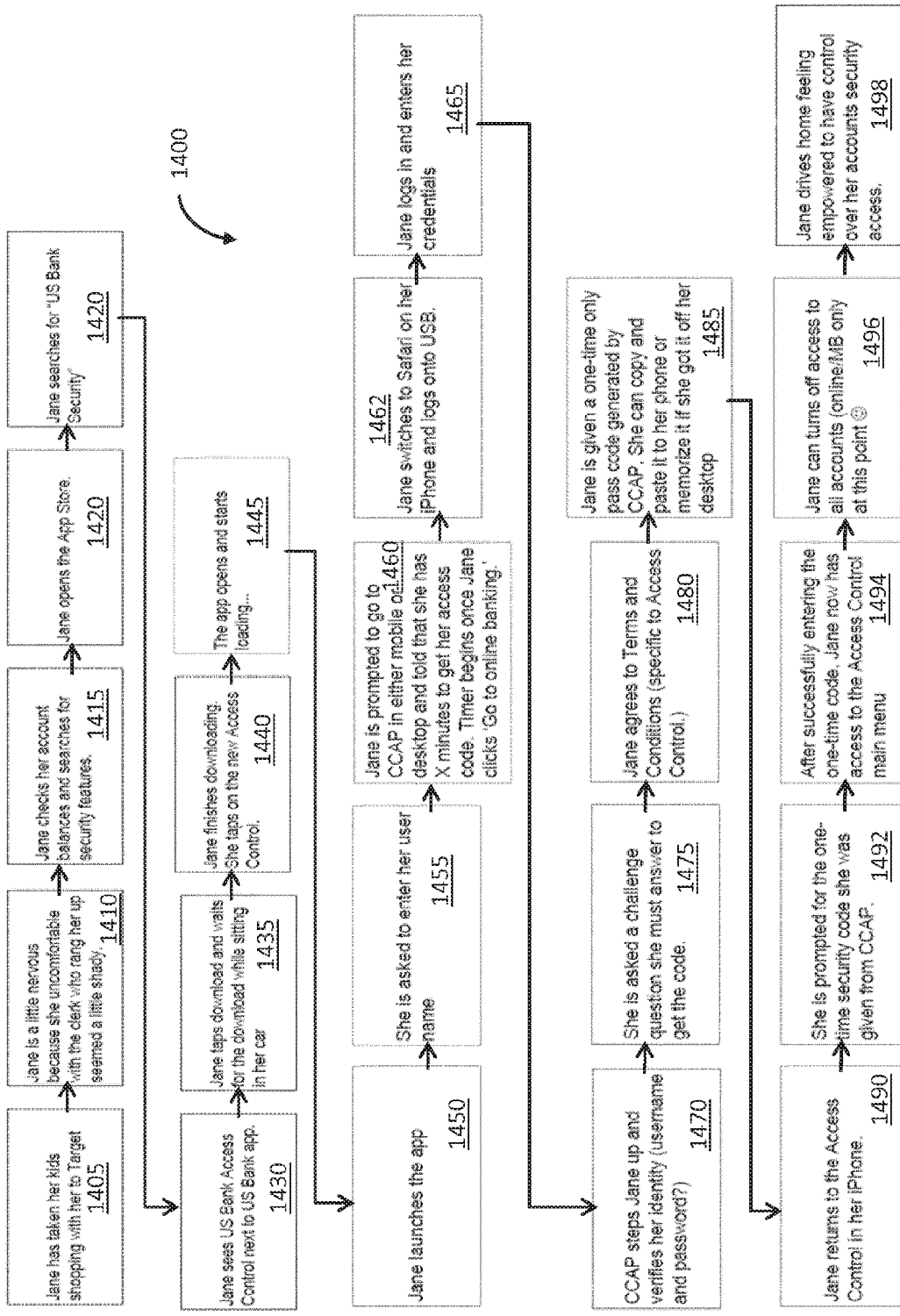
FIG. 14 is a flow diagram illustrating a method for installing and using an access control application in accordance with an illustrative embodiment.

FIG. 14 is a flow diagram illustrating a method 1400 for installing and using an access control application in accordance with an illustrative embodiment. In alternative embodiments, fewer, additional, and/or different operations may be performed. Also, the use of a flow diagram is not meant to be limiting with respect to the order of operations performed. FIG. 14 illustrates a real life example of an individual named Jane who goes shopping, downloads the access control app, and successfully enrolls, authenticates, and uses the access control app.

In an operation 1405, Jane goes shopping. In an operation 1410, Jane gets nervous while paying for her goods because the clerk seems suspicious. In an operation 1415, Jane uses her smart phone to check account balances to make sure nothing bad has happened and looks for additional security features to protect her account. In an operation 1420, Jane opens an App Store. In an operation 1425, Jane looks for "US Bank Security" in order to further protect her US Bank account. In an operation 1430, Jane sees the US Bank Access Control App. In an operation 1435, Jane downloads the access control app. In an operation 1440, Jane opens the access control app. In an operation 1445, the access control app opens. In an operation 1450, Jane launches the access control app.

In an operation 1455, Jane is prompted to and enters her user id for her bank account. In an operation 1460, Jane is prompted to go to an online banking website in either her smart phone or a desktop computer. Jane is told by the access control app that she has only a certain number of minutes (e.g., 10 minutes) to get her activation (access) code for the access control app. The timer in this embodiment begins when Jane selects a hyperlink to go to online banking to retrieve a generated activation code. In an operation 1462, Jane switches to a web browser on her smart phone and logs on to online banking. In an operation 1465, Jane enters her credentials to log on. In an operation 1470, a step up challenge is provided to Jane to verify her identity. In an operation 1475, Jane is asked a challenge question that she must answer to get the code. In an operation 1480, Jane agrees to the terms and conditions for the access control app.

In an operation 1485, Jane is given a one-time use only activation pass code that she may copy and paste within her smart phone. In an operation 1490, Jane returns to the access control app in her smart phone. In an operation 1492, Jane is prompted for the one-time activation pass code. In an operation 1494, Jane successfully enters the one-time activation pass code and has access to the access control app main menu. In an operation 1496, Jan turns off access to all her online and mobile banking accounts, such that no one can use them, regardless of log in or other credentials or what device is used (even Jane's smart phone). In an operation 1498, Jane drives home feeling empowered to have control over her accounts' security access.

Figure 16:
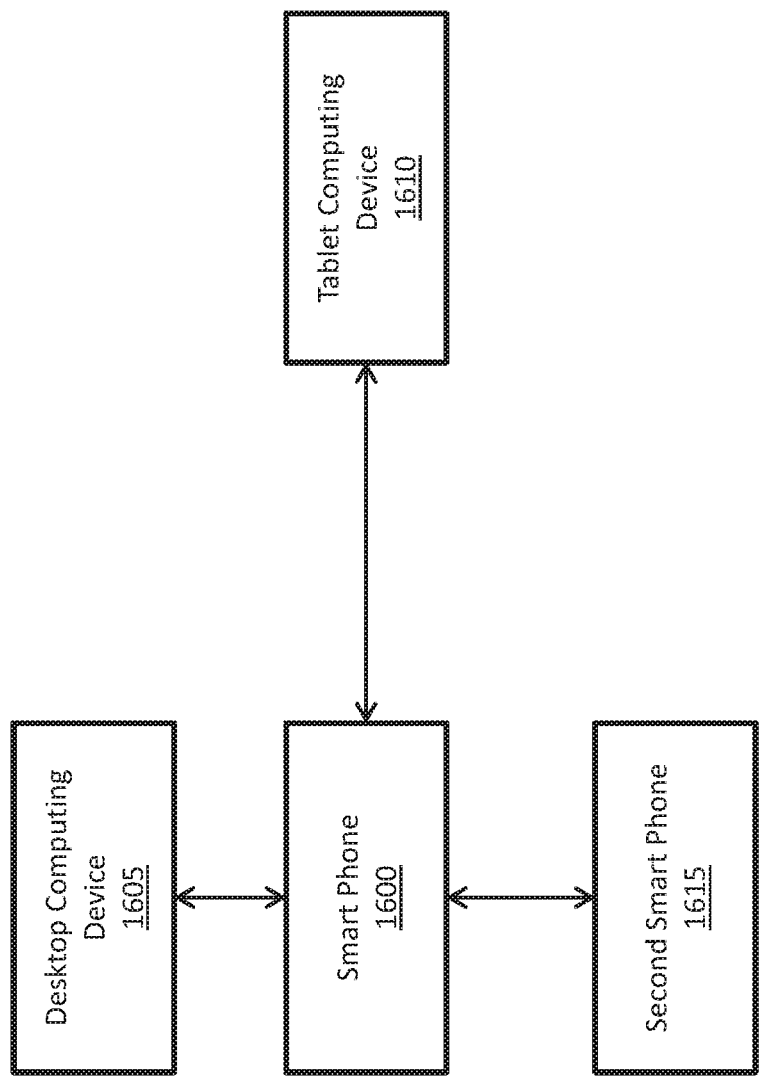
FIG. 16 is a block diagram illustrating communication between a smart phone and multiple other devices in accordance with an illustrative embodiment.

FIG. 16 is a block diagram illustrating communication between a smart phone and multiple other devices in accordance with an illustrative embodiment. In alternative embodiments, fewer, additional, and/or different components may be included in the system. FIG. 16 shows a smart phone 1600. The smart phone 1600 has stored upon it an access control application as disclosed herein. The smart phone 1600 can also access mobile and/or online banking features as disclosed herein.

In this embodiment, the smart phone 1600 can control online and mobile banking accessibility and features used and/or accessed on the smart phone 1600 as disclosed herein. In addition, the smart phone 1600 can also control online and mobile banking accessibility and features used and/or accessed on other electronic devices. Here, the smart phone 1600 can control online and mobile banking accessibility and features on a desktop computing device 1605, a tablet computing device 1610, and a second smart phone 1615. In alternative embodiments, additional, different, or fewer devices may be controlled by the smart phone 1600.

In a first example, the smart phone 1600 may control the desktop computing device 1605, the tablet computing device 1610, and the second smart phone 1615 with the same command. In other words, when a setting, control, or function is performed with the access control app on the smart phone 1600, it automatically applies that command or rule to all of the desktop computing device 1605, the tablet computing device 1610, and the second smart phone 1615. For example, if a user of the smart phone 1600 turns off wire transfers in and/or out of his or her checking account, a wire transfer cannot be executed using any of the desktop computing device 1605, the tablet computing device 1610, and the second smart phone 1615. In an additional embodiment, such a rule or command established by the user of the smart phone 1600 may also be applied to the checking account regardless of any particular device that is used to attempt to transfer money in and/or out of the account.

In a second example, the access control app on the smart phone 1600 can set rules or commands regarding particular electronic devices. In this embodiment, the system may associate various electronic devices with an account or accounts of a particular user of the smart phone 1600. In order to associate the various devices, such as the desktop computing device 1605, the tablet computing device 1610, and the second smart phone 1615, with the smart phone 1600 and the user's accounts, the user may have to authenticate each device separately through an online authentication process. The online authentication process may include, for example, some or all of the steps shown in FIG. 3 and discussed herein. Another authentication process may include communications (through a wired connection or wirelessly, such as Wi-Fi or Bluetooth) between the smart phone 1600 any of the desktop computing device 1605, the tablet computing device 1610, and the second smart phone

1615. For example, the smart phone 1600 may be plugged into the desktop computing device 1605. While plugged in, the user may activate the access control app on the smart phone 1600 and authenticate the desktop computing device 1605 so that the desktop computing device 1605 can be controlled in the future by the access control app. In other examples, the smart phone 1600 may connect to a tablet computing device 1610 through a local Wi-Fi network to authenticate the tablet computing device 1610. In another example, the smart phone 1600 may connect to the second smart phone directly to authenticate the second smart phone 1615. For example, Bluetooth communications may be used.

In the embodiment of FIG. 16, one or more of the devices may have an access control app that controls access to or functionalities of single account. A single user of the access control app may also be linked to multiple banking accounts, such that access to or functionalities of multiple accounts may be controlled from any one of the devices shown in FIG. 16. For example, a user using an access control app on the smart phone 1600 may allow the second smart phone 1615 to make mobile purchases and money transfers of less than $100 on a first account, such as a checking account, while preventing the second smart phone 1615 from making any purchases or money transfers on a second account, such as a savings account. Additionally, the user using the access control app on the smart phone 1600 may, for example, allow the tablet computing device 1610 to make any purchases or money transfers for either the first or second accounts. Further, the user may, for example, use the desktop computing device 1605 to adjust the settings of any of the devices for any of the various accounts that a user associates with an access control app. If access control features are integrated into a different app that has a particular functionality, implementing access control features may still be applied to multiple devices or customized for multiple devices. If the access control features are integrated into a different app, the user may only be able to adjust access control features related to that app. In other embodiments, the user may be able to adjust access control features for any account linked to the user's access control account even though the user adjusts access control features through an app that is different from a dedicated access control app.

The access control features for multiple devices of FIG. 16 are, in some embodiments, implemented as a primary and secondary devices. Certain devices may be set, using the access control app or features embedded within another app, as primary or secondary devices. For example, a user may authorize access control for an account on the smart phone 1600 and designate the smart phone 1600 as the primary device. In one example, the primary device may perform any functions (i.e., the access of the smart phone 1600 is not limited at all). The user may also designate that the second smart phone 1615 is a secondary device. The secondary device may be authenticated by the user before, during, or after the process of setting the second smart phone 1615 as the secondary device. In this way, the smart phone 1600 may control access to features or accounts as disclosed herein for the second smart phone 1615, but may not be limited by those settings itself.

Figure 17:
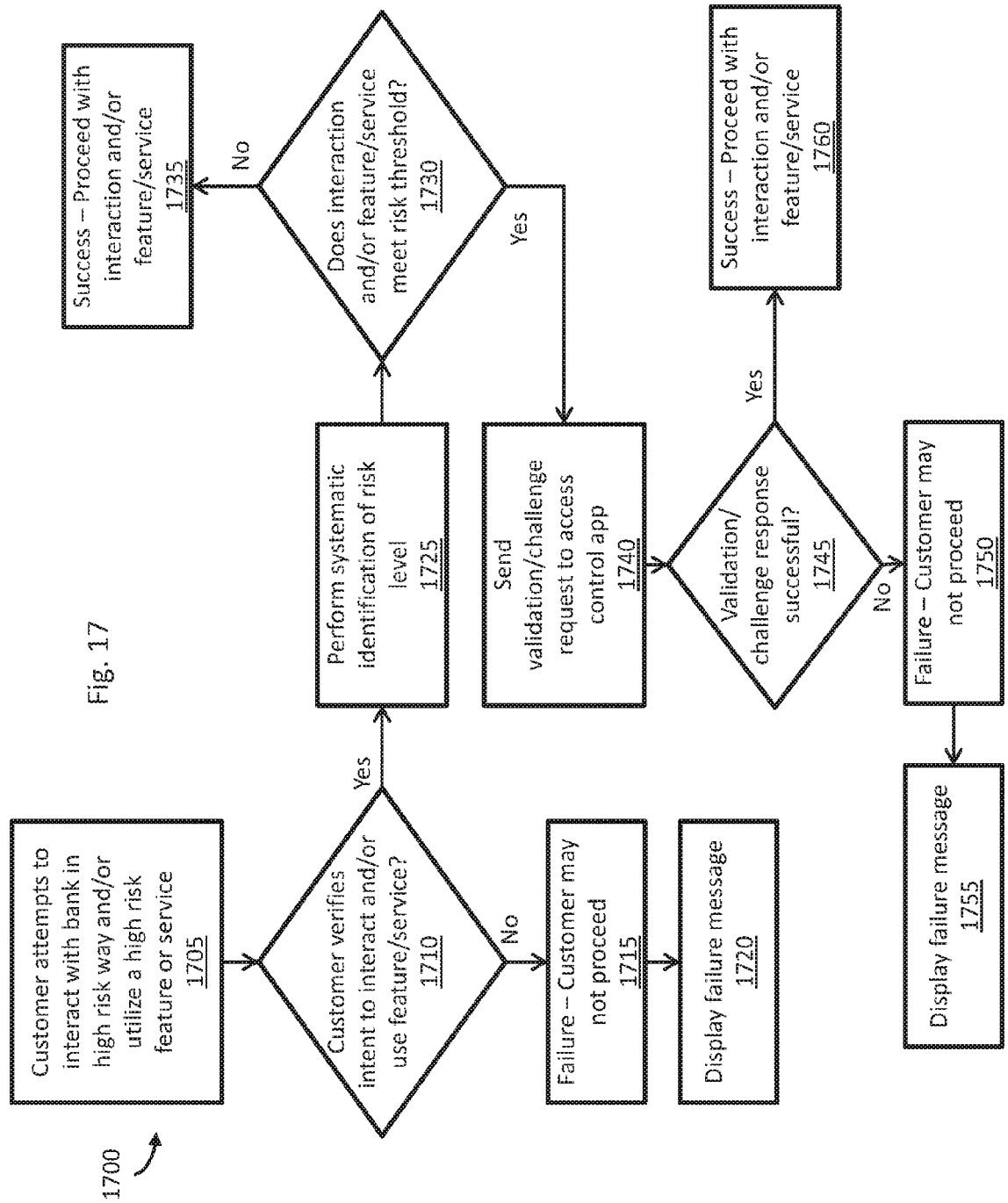
FIG. 17 is a flow diagram illustrating a method for authenticating a transaction in session in accordance with an illustrative embodiment.

FIG. 17 is a flow diagram illustrating a method 1700 for authenticating a transaction in session in accordance with an illustrative embodiment. In alternative embodiments, fewer, additional, and/or different operations may be performed. Also, the use of a flow diagram is not meant to be limiting with respect to the order of operations performed. In an operation 1705, a customer attempts to interact with a bank in a high risk way and/or utilize a high risk feature or service. High risk interactions, features, and services are designated as risk by the potential risk of loss that they pose to a customer and/or the bank. For example, a high risk interaction may be an attempt to make a purchase over a certain amount, for example over five hundred dollars. Another high risk service may be withdrawing money from an ATM, or withdrawing a certain amount of money from an ATM or using ATMs at a certain frequency. Another high risk interaction may be a request to increase a credit limit. A high risk feature or service may be wire transferring money. Another high risk interaction may be changing the contact information or authentication relating to an account. Another high risk feature or service may be requesting a new credit card. Another high risk interaction may be an attempt to gain access into a secure ATM area.

In an operation 1710, the system verifies the user's intent to interact with the system in a high risk way. For example, the system may prompt the user on their smart phone or another electronic device to ask if they really wish to perform that action or access that feature or service. The prompt may be in various forms, such as a text message, chat message, instant message, e-mail message, push notification, or other type of prompt. If the user responds that they are not intending to perform the interaction or access the feature or service, the system acknowledges a failure and the customer may not proceed in an operation 1715. In an operation, 1720, a failure message is displayed to the customer that the interaction cannot be completed. In this way, someone who may be attempting to perform a fraudulent act or transaction, for example, can be blocked from doing so in almost real time. For example, a person with stolen credit card information may attempt to use that information to make purchases on the internet. If the system recognizes those purchases as high risk, the system can send a text to the customer on their telephone confirming whether the transaction is intended. If the customer is not really the individual attempting the transaction, the customer can reply no and the individual attempting the fraudulent transaction will be blocked from completing the transaction.

In an operation 1725, the system determines a systematic identification of risk level for the interaction, feature, or service. Rather than identifying simply that an interaction, feature, or service is high risk, as in the operation 1705, the operation 1725 quantifies the risk of the interaction, feature, or service. In other words, the system determines how risky (what is the magnitude of potential losses for the bank and/or customer) the interaction, feature, or service is. In an operation 1730, the system determines if the interaction, feature, or service meets a predefined risk threshold. For example, the threshold may be set at a potential loss to the bank and/or customer of $10,000. The threshold may be determined by the bank or the customer. If the threshold is not met, the customer can proceed with the interaction, feature, or service in an operation 1735.

If the threshold is met, the system sends a validation/challenge request to the access control app on the user's electronic device in an operation 1740. The validation and/or challenge request initiated through the access control app may be any of the authentication or validation methods disclosed herein, such as those discussed with respect to FIG. 3, for example. In an operation 1745, the system determines if the validation and/or challenge response is successful.

If the validation and/or challenge response is not successful, a failure is determined and the customer may not proceed in an operation 1750. In an operation 1755, the system also displays a message to the customer that the attempted interaction, feature, or service has failed and will not be executed. If the validation and/or challenge response is successful, the customer can proceed with the interaction, feature, or service in an operation 1760.

Figure 18:
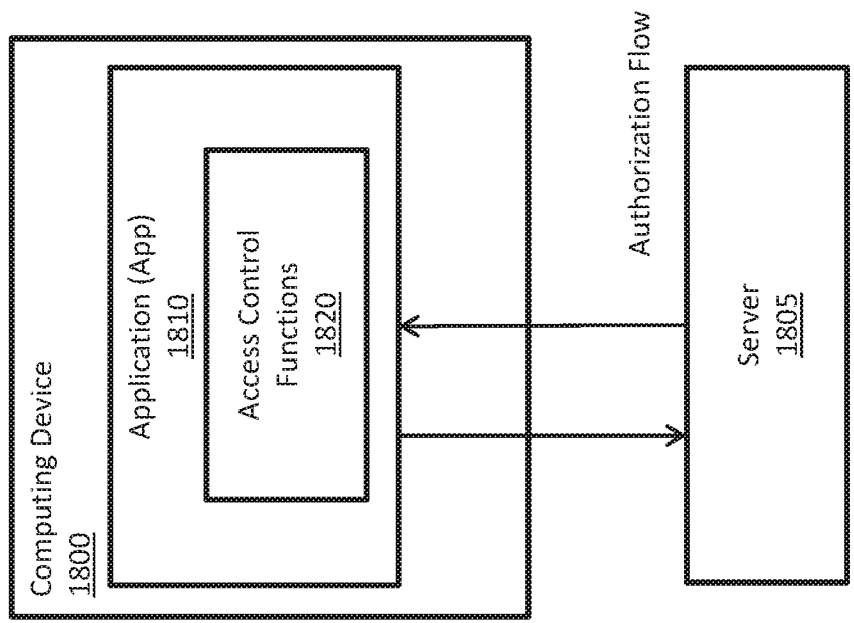
FIG. 18 is a block diagram illustrating communication between a server and a computing device with access control functions embedded in an app in accordance with an illustrative embodiment.

FIG. 18 is a block diagram illustrating communication between a server 1805 and a computing device 1800 with access control functions 1820 embedded in an app 1810 in accordance with an illustrative embodiment. Installed on the computing device is an app 1810 that includes access control functions 1820. Some embodiments disclosed herein have a separate app for access control. However, the app 1810 includes the access control functions 1820. Accordingly, the access control functions 1820 are present when an app is installed or updated. The access control functions 1820 control aspects of the app 1810, similar to other examples described herein throughout, except that the access control functions 1820 are integrated into the app 1810. In an alternate embodiment, the access control functions may control aspects of the app 1810 as well as other separate apps on the computing device 1800.

The app 1810 (and the computing device 1800) are configured to communicate with the server 1805. Here an authorization flow is shown. As further described with respect to FIG. 21, authentication information for the app 1810 can be leveraged to authorize the access control functions 1805. Accordingly, authorization for using the access control features 1820 or approving actions based on policies set using the access control features 1820 can flow through the server 1805, which is the same server that the app 1810 uses for authentication, such as logging in to the app 1810.

Figure 19:
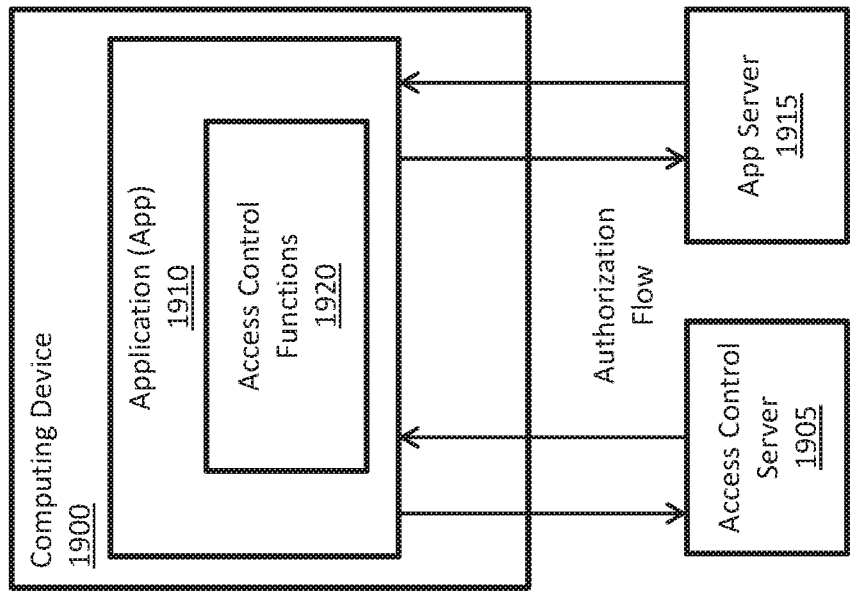
FIG. 19 is a block diagram illustrating communication between two servers and a computing device with access control functions embedded in an app in accordance with an illustrative embodiment.

FIG. 19 is a block diagram illustrating communication between two servers 1905 and 1915 and a computing device 1900 with access control functions 1920 embedded in an app 1910 in accordance with an illustrative embodiment. The computing device 1900 is similar to the computing device 1800 of FIG. 18, except that the app 1910 (and therefore also the computing device 1900) communicates with an access control server 1905 and an app server 1915. In this embodiment, although the access control functions 1920 are integrated into the app 1910, the authorization flow for access control functions 1920 flow through the access control server 1905, while authentication for features of the app 1910 (such as logging in) flow through the app server 1915.

FIG. 20 is a figure representing a user interface 2000 that shows access control functions embedded in an app in accordance with an illustrative embodiment. The user interface 2000 shows an advanced security link 2005 which can open a screen for the access control features disclosed herein. For example, selecting the link 2005 may access the user interfaces shown in any of FIGS. 9-13 and described above. Although the link 2005 is shown on a login page, the link 2005 could appear on any page in an app where access control features are integrated.

FIG. 21 is a flow diagram illustrating a method 2100 for leveraging authentication information of a host app in accordance with an illustrative embodiment. In alternative embodiments, fewer, additional, and/or different operations may be performed. Also, the use of a flow diagram is not meant to be limiting with respect to the order of operations performed. In an operation 2105, an app is opened. In an operation 2110, access control features embedded in an app are engaged. For example, the link 2005 of FIG. 20 may be selected to engage the access control features embedded in an app.

In an operation 2115, the system determines if the user is already logged into the app when the access control features are engaged in the operation 2110. If the user is already logged in to the app, the app can leverage the user identification information of the app (e.g., leverage the authentication information already entered to log in to the app) to authenticate activating, engaging, using etc. any of the access control features in an operation 2120.

If the system determines that the user is not already logged into the app at the operation 2115, the app prompts the user to login to the app and/or create an account for the app in an operation 2125. In an operation 2130, the user is prompted by the app to create an account for and/or log into the app. Once the user has created an account and/or logged in, the user identification information of the app is used to activate, engage, use, etc. any of the access control features in the operation 2120. The method 2100 may be used by either of the devices shown in FIGS. 18 and 19.

FIG. 22 is a flow diagram illustrating a method 2200 for authenticating a transaction in accordance with an illustrative embodiment. In alternative embodiments, fewer, additional, and/or different operations may be performed. Also, the use of a flow diagram is not meant to be limiting with respect to the order of operations performed. In an operation 2205, a user sets access control functions (either integrated in another app or in a separate access control app) to request authorization of a money transaction and/or transfer. In other words, the user indicates with the access control features that they would like to be requested any time a transaction and/or transfer of money occurs. This may also be a qualified setting as disclosed herein throughout (e.g., only for certain types of transactions, certain amounts).

In an operation 2210, the system recognizes that a money transaction and/or transfer has been initiated that qualifies for an authorization request from the user as set in the operation 2205. In an operation 2215, a server of the system sends a push notification to the user's mobile device requesting authorization of the money transaction and/or transfer.

In an operation 2220, the user on their mobile phone uses the access control features to authorize the money transaction and/or transfer. In an operation 2225, in response to the authorization, the money transaction and/or transfer is allowed to be completed. In an alternative embodiment, the user does not give authorization and the money transaction and/or transfer is not allowed to be completed. In another alternative embodiment, the user confirms that they do not authorize the transaction and/or transfer, and an additional remedial action is taken such as suspending the user's account, credit card, etc.

In an illustrative embodiment, the access control app may include fraud reporting, system logging, and usage tracking features. The access control app may track general use and duration of use at a page level for the access control app. The access control app may supply customer level transaction reporting on the features enabled and disabled by a customer using the access control app. The overall system servers that serve the access control apps on various machines can also be monitored. For example, servers may be monitored to determine traffic, errors, capacity, thresholds for failure, etc. Events involved in the usage of an access control app can also be tracked and recorded. For example, events that may be monitored and tracked may include access privileges, authentication attempts (success and failures), sessions established, security control violations, unauthorized attempts to alter or access the system, creation or deletion of user ids, changes in user security profiles or attributes, modification of user privileges, changes to system access privileges, and users authenticated and positively identified before accessing the system. Such data may be useful for fraud tracking and prevention, as well as for any mandatory reporting required by law or policy. Any of the data tracked or recorded at the access control app can be stored/logged/archived in the mobile device or at a server.

In an alternative embodiment, an access control app can control an app that is not a mobile banking app. For example, an access control app may be used to control features of a credit card account, stored value card account, rewards program account, online auction account, online money transfer or pay services account, online marketplace account, utility (such as gas, electric, water, sewage, trash, etc.) accounts, technology service (phone, cellular, data, internet, pay television, etc.) accounts, insurance accounts, and the like may be controlled using an access control app. For example, a user may be able to control technology service accounts, such as whether to receive certain channels or programming. in another example, a user may control how high an account is allowed to bid or spend in an online marketplace or auction environment. In another embodiment, a user may control the data plan for their phone or the speed of their home internet using the access control app.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for providing exclusive mobile access and functionality control to a banking account, the apparatus comprising:
   a memory;
   a processor coupled to the memory; and
   an access control app comprising a first set of instructions stored on the memory and configured to be executed by the processor, wherein the processor is configured to:
      determine authentication data, wherein the authentication data comprises an indication that a first functionality of an application program comprising second set of instructions can be controlled, wherein the application program comprising the second set of instructions is separate from and resides on a different device than the access control app, wherein the first functionality comprises a mobile or online banking function that includes a withdrawal of funds from a mobile banking account, a transfer of funds from the mobile banking account, a payment of a bill from the mobile banking account, a log on into the mobile banking account, a report of the mobile banking account balance, a change of contact information associated with the mobile banking account, or a disablement of the second set of instructions;
      send, to a user interface during operation of the access control app, an indication that the first functionality of the application program can be controlled;
      receive, through the user interface during operation of the access control app, a request to control the first functionality of the application program;
      send an order to disable the first functionality of the application program; and
      remove access control for any previously-enrolled access control apps to no longer control any access or functionality of the application program.

2. The apparatus of claim 1, wherein the application program comprising the second set of instructions is stored on the memory.

3. The apparatus of claim 1, wherein the indication of the first functionality comprises an indication that the first functionality is not currently being controlled.

4. The apparatus of claim 1, wherein the indication of the first functionality comprises an indication that the first functionality is currently being controlled such that the first functionality cannot be accessed.

5. A method for providing exclusive mobile access and functionality control to a banking account according to an access control app comprising a first set of instructions stored on the memory of a computing device, the method comprising: determining, by a processor of the computing device, authentication data, wherein the authentication data comprises an indication that a first functionality of an application program comprising a second set of instructions can be controlled, wherein the application program comprising the second set of instructions is separate from and resides on a different device than the access control app, wherein the first functionality comprises a mobile or online banking function; wherein the determining the authentication data comprises: receiving, at the processor of the computing device, through the user interface, an alphanumeric sequence randomly generated outside the access control app comprising the first set of instructions; sending, by the processor of the computing device, to a server, the alphanumeric sequence; and receiving, at the processor of the computing device, from the server, an existing account authentication that indicates the alphanumeric sequence is associated with an existing mobile banking account, wherein no other computing device can control the first functionality of the application program comprising the second set of instructions after the receiving of the existing account authentication; sending, by the processor of the computing device, to a user interface during operation of the access control app, an indication that the first functionality of the application program can be controlled; receiving, at the processor of the computing device, through the user interface during the operation of the access control app, a request to control the first functionality of the application program; and sending, by the processor of the computing device, an order to disable the first functionality of the application program.

6. The method of claim 5, wherein determining the authentication data comprises:
   receiving, at the processor of the computing device, through the user interface, a user defined identification pattern;
   sending, by the processor of the computing device, to a server, the user defined identification pattern; and
   receiving, at the processor of the computing device, from the server, an existing account authentication that indicates the user defined identification pattern are associated with an existing mobile banking account.

7. The method of claim 5, wherein the determining the authentication data comprises:
   sending, to the user interface, an enhanced authentication wherein the enhanced authentication is a challenge question;

receiving, through the user interface, an answer to a challenge question associated with an existing mobile banking account;

sending, by the processor of the computing device, to a server, the answer to the challenge question; and receiving, at the processor of the computing device, from the server, an existing account authentication that indicates the answer is associated with an existing mobile banking account.

8. The method of claim 5, wherein the determining the authentication data comprises determining, by the processor of the computing device, the presence of a digital authentication certificate stored on the memory of the computing device.

9. The method of claim 5, wherein the determining the authentication data comprises determining, by the processor of the computing device, the presence of a digital authentication certificate by:

sending, by the processor of the computing device, to a server, a request for authentication by digital authentication certificate; and receiving, at the processor of the computing device, from the server, a confirmation of the presence of the digital authentication certificate stored on a memory of the server.

10. A system for providing exclusive mobile access and functionality control to a banking account, the system comprising:

a first memory;

a first processor coupled to the first memory, wherein an access control app comprising a first set of instructions is stored on the first memory and is configured to run on the first processor;

a second memory; and a second processor coupled to the second memory, wherein an application program app comprising a second set of instructions is stored on the second memory and is configured to run on the second processor, and further wherein the application program comprising the second set of instructions is separate from and resides on a different device than the access control app;

wherein:

the first processor is configured to execute the access control app comprising the first set of instructions to:

determine authentication data, wherein the authentication data comprises an indication that a first functionality of the application program comprising the second set of instructions can be controlled, wherein the first functionality comprises a mobile or online banking function that includes a withdrawal of funds from a mobile banking account, a transfer of funds from the mobile banking account, a payment of a bill from the mobile banking account, a log on into the mobile banking account, a report of the mobile banking account balance, a change of contact information associated with the mobile banking account, or a disablement of the second set of instructions;

send, to a user interface during operation of the access control app, an indication that the first functionality of the application program can be controlled;

receive, through the user interface during operation of the access control app, a request to control the first functionality of the application program;

send an order to control the first functionality of the second app;

remove access control for any previously-enrolled access control apps to no longer control any access or functionality of the application program; and the second processor is configured to execute the application program comprising the second set of instructions to:

receive the order to control the first functionality of the application program.

11. The system of claim 10, wherein the second processor is further configured to execute the application program comprising the second set of instructions to send, to the user interface, a message indicating the order to control the first functionality.

12. The system of claim 10, wherein the first processor and the second processor are the same processor, and the first memory and the second memory are the same memory.

13. The system of claim 10, wherein the first memory and the second memory are different memories, and the first processor and the second processor are different processors.

14. The system of claim 10, wherein:

the second processor is further configured to execute the application program comprising the second set of instructions to:

receive, through the user interface, login information associated with a user account;

send, to the user interface, an enhanced authentication request;

receive, through the user interface, reply information to the enhanced authentication request;

send, to a server, the reply information and the login information;

receive, from the server, an alphanumeric sequence associated with the user account; and send, to the user interface, the alphanumeric sequence; and the first processor is further configured to:

receive, through the user interface, the alphanumeric sequence;

send, to the server, the alphanumeric sequence; and receive, from the server, a confirmation that the alphanumeric sequence is associated with the user account, wherein the confirmation serves as the determined authentication data.

15. The system of claim 14, wherein if the alphanumeric sequence is not sent to the server by the first processor within a predetermined amount of time after the second processor receives the alphanumeric sequence, the first processor will not receive the confirmation from the server.

16. The system of claim 10, wherein the second processor is further configured to prohibit the first functionality from operating based on the order.

17. The system of claim 10, wherein a portable computing device comprises the first memory and the first processor, wherein the portable computing device has a signature, and further wherein the first processor is configured to:

send, to a server, the signature; and receive, from the server, a confirmation that the signature is associated with a user account, and wherein the confirmation serves as the determined authentication data.

* * * * *